United States Patent
Brooks et al.

(10) Patent No.: US 8,281,352 B2
(45) Date of Patent: Oct. 2, 2012

(54) METHODS AND APPARATUS FOR BANDWIDTH RECOVERY IN A NETWORK

(75) Inventors: Paul D. Brooks, Weddington, NC (US); Tom Gonder, Tega Cay, SC (US)

(73) Assignee: Time Warner Cable Inc., New York, NY (US)

( * ) Notice: Subject to any disclaimer, the term of this patent is extended or adjusted under 35 U.S.C. 154(b) by 769 days.

(21) Appl. No.: 12/152,749

(22) Filed: May 15, 2008

(65) Prior Publication Data

US 2008/0320540 A1    Dec. 25, 2008

Related U.S. Application Data

(60) Provisional application No. 60/930,450, filed on May 15, 2007.

(51) Int. Cl.
*H04N 7/173* (2011.01)

(52) U.S. Cl. .......... 725/95; 725/114; 725/115; 725/116; 725/117; 725/118

(58) Field of Classification Search .......... 725/114–118, 725/95
See application file for complete search history.

(56) References Cited

U.S. PATENT DOCUMENTS

| | | | |
|---|---|---|---|
| 5,745,837 A * | 4/1998 | Fuhrmann | 725/114 |
| 5,822,530 A | 10/1998 | Brown | |
| 5,838,921 A | 11/1998 | Speeter | |
| 5,940,738 A | 8/1999 | Rao | |
| 6,125,397 A | 9/2000 | Yoshimura et al. | |
| 6,345,038 B1 | 2/2002 | Selinger | |
| 6,473,793 B1 | 10/2002 | Dillon et al. | |
| 6,643,262 B1 | 11/2003 | Larsson et al. | |
| 6,718,552 B1 | 4/2004 | Goode | |
| 6,909,726 B1 | 6/2005 | Sheeran | |
| 7,207,055 B1 | 4/2007 | Hendricks et al. | |
| 7,336,787 B2 | 2/2008 | Unger et al. | |
| 7,609,637 B2 | 10/2009 | Doshi et al. | |
| 7,936,775 B2 | 5/2011 | Iwamura | |
| 2003/0056217 A1* | 3/2003 | Brooks | 725/46 |
| 2005/0188415 A1* | 8/2005 | Riley | 725/116 |
| 2009/0141696 A1 | 6/2009 | Chou et al. | |

* cited by examiner

*Primary Examiner* — Dominic D Saltarelli
(74) *Attorney, Agent, or Firm* — Gazdzinski & Associates, PC

(57) ABSTRACT

Methods and apparatus for recovery and/or utilization of bandwidth within a network. In one embodiment, the network comprises a switched architecture (e.g., broadcast switched) content-delivery network such as a cable television network. Reclamation, overflow, and/or triage logical processes are selectively applied in order to more efficiently manage bandwidth utilization within the network while maintaining user experience, and optionally achieve one or more business and/or operational goals.

20 Claims, 15 Drawing Sheets

METHODS AND APPARATUS FOR BANDWIDTH RECOVERY IN A NETWORK

PRIORITY

This application claims priority to U.S. Provisional Patent Application Ser. No. 60/930,450 filed May 15, 2007 of the same title, which is incorporated herein by reference in its entirety.

BACKGROUND OF THE INVENTION

1. Field of Invention

The present invention relates generally to the field of providing content over a network and other distribution channels, and specifically in one embodiment to bandwidth recovery in a switched network environment.

2. Description of Related Technology

One significant competitive challenge presently faced by network operators relates to managing and conserving bandwidth. This includes the reclamation of otherwise under-utilized or unused bandwidth such that the service and/or customer base can be expanded without significant modifications or build-outs of the underlying network infrastructure. For example, it is clearly desirable to expand the types and availability of "next-generation" network services, including high-definition (HD) broadcast, VOD, high-speed data, VoIP, Interactive TV, etc. over time, without the need for major capital expenditures or system modifications. Hence, network operators are increasingly focused on techniques for "squeezing" as much capacity out of their existing networks as possible.

The foregoing need for bandwidth optimization and reclamation is also applicable to so-called "switched" network architectures. These architectures generally distribute all of the available content provided by the network operator (e.g., multiple systems operator, or MSO) to switches within the network; these switches are then used to selectively provide only those channels actually watched or requested by users to their hubs or nodes for delivery, thereby effectively deleting unwatched channels from the digital broadcast stream. A "deleted" channel is automatically switched back on when a subscriber subsequently selects it, with the switching and delivery transition being for all intents and purposes transparent to the subscriber. This approach has obvious benefits from the standpoint of bandwidth conservation.

Bandwidth Recovery

A BSA system must at least periodically recover bandwidth to operate. If bandwidth is not recovered, the QAM pool will become clogged with stale streams—streams with tuners but no viewers. Viewership qualification and bandwidth recovery are salient factors differentiating BSA systems form simple multicast systems. Viewership must be qualified in a well-considered and "respectful" way in order to derive the greatest benefit to all viewers.

An ideal BSA system should be efficient and robust in the face of over-subscription pressure. However, betterment of these goals should also be considered in the context of a transparent user experience. Ideally, the subscriber is not aware of any difference between BSA program viewing and broadcast program viewing.

A ready amount of bandwidth workspace within the BSA system makes possible rapid stream setup for fast response to program viewing requests. The most desirable and frequent means to build and maintain this workspace is through tuner tracking. The bandwidth workspace grows when viewers vacate the BSA pool, such as by tuning away or turning off their CPE (e.g., settops).

When this technique alone is not sufficient, bandwidth recovery processes are used. In the great majority of cases, operation of these processes will not be known to the subscriber, thereby maintaining the desired transparency.

Within the BSA system, some program streams are allowed to continue to flow even when all known tuners have tuned away. These streams may be being viewed by non-responding clients that do not have upstream connections. This technique makes the system more robust, in that loss of two-way connectivity appears to the customer as a partial loss of programming, and not a complete outage.

The prior art discloses a variety of techniques relating to the reclamation of bandwidth in a content-based network. For example, U.S. Pat. No. 5,838,921 to Speeter issued Nov. 17, 1998 and entitled "Distributed connection management system with replication" discloses a distributed connection management system for an interactive multimedia network that controls the allocation and recovery of bandwidth resources in the network between client and server. The connection manager accepts as input the topology of a network to be controlled and partitions the local access portion of the network into separately administered neighborhoods. Resources for each of the partitioned neighborhoods are allocated by a replicated neighborhood connection manager. The remainder of the network is partitioned into the switched ATM network and into server network resources. Resources within the switched ATM network are administered by an ATM connection manager. Resources into and out of the servers are managed using a server connection manager. A connection within the network is achieved through the neighborhood connection manager by determining the other components of the connection manager needed to achieve the connection and combining the resources allocated by all three components of the connection manager and returning them to the client.

U.S. Pat. No. 6,909,726 to Sheeran issued Jun. 21, 2005 and entitled "Adaptive bandwidth system and method for broadcast data" discloses a system and method for optimizing bandwidth efficiencies in the distribution of digital video, digital audio and data over a cable television system. Different transmission channels or portions thereof can be dynamically customized to contain only those digital video, digital audio and data components of value at that time to the customers served by those channels. This customization requires a dynamic bandwidth management component which has the ability to monitor and react to changing customer usage patterns and to instruct a re-multiplexor to allocate bandwidth from digital services that require less bandwidth at a given time to services that require more bandwidth.

Various techniques for resource management are also evidenced in the prior art. See, e.g., U.S. Pat. No. 6,643,262 to Larsson, et al. issued Nov. 4, 2003 and entitled "System and method for dynamic sharing of connection resources" which discloses a system and method for the efficient utilization of core telecommunications resources (including both switching and transport resources) during a datacom session over a connection-oriented telecommunications system is described. First, the telecommunications resources along a connection path are partitioned into two or more segments. One or more pause sensors placed along the connection path detect periods of inactivity in a connection. Whenever such a period of inactivity is detected, the pause sensor selectively causes the release of core telecommunications resources for reallocation to active applications, typically by deactivating one or more segments. When wake-up sensors detect renewed activity over the connection, then the dormant connection is reactivated by reallocating core physical resources. The dynamic connection technique can be used both with analog (inband) signaling systems (e.g., Plain Old Telephone Service) as well as with digital signaling systems (e.g., Integrated Services Digital Network). The deactivation and reactivation of core telecommunications resources can be performed using various priority schemes.

Still other prior art teaches methods of rationing or allocating the amount of bandwidth utilized. For example, U.S. Pat. No. 5,822,530 to Brown issued Oct. 13, 1998 and entitled "Method and apparatus for processing requests for video on demand versions of interactive applications" discloses an interactive communication system, a method and apparatus for processing requests for video-on-demand versions of interactive applications. One embodiment initially receives a request to transmit a video on-demand version of a particular interactive application. This embodiment then determines if transmission of this video-on-demand version would constrain resources of the interactive communication system. If the system's resources would not be constrained, the interactive system provides the viewer with the video-on-demand version of the interactive application. On the other hand, if the system's resources would be constrained by the transmission of the VOD version, then the invention (1) denies the request for the video-on-demand version, and (2) directs the requesting viewer to view a near video-on-demand version of the particular application.

U.S. Pat. No. 6,473,793 to Dillon, et al. issued Oct. 29, 2002 and entitled "Method and apparatus for selectively allocating and enforcing bandwidth usage requirements on network users" discloses a hybrid gateway which includes functionality that allows bandwidth on a network (such as a satellite link) to be dynamically allocated and enforced. The hybrid gateway compares the thresholds defined for a requesting terminal's level of service and its measured running average data throughput to determine if the requesting terminal's bandwidth should be reduced (throttled). The hybrid gateway intercepts requests made by the requesting terminals and, if necessary, reduces the advertized window size of requests made by the requesting terminal, thereby reducing the transmission speed of the link and therefore the bandwidth of the link.

U.S. Pat. No. 5,940,738 to Rao issued Aug. 17, 1999 and entitled "Video pedestal network" discloses an architecture for distributing digital information to subscriber units wherein selection from among multiple digital services is accomplished by transmitting a tuning command from a subscriber unit to an intermediate interface. The intermediate interface selects the desired service from a broadband network and transmits it to the subscriber unit over a bandwidth-constrained access line. The bandwidth-constrained access line may be implemented with existing infrastructure, yet the subscriber unit may access a wide variety of digital information available on the broadband network. Universal broadband access is thus provided at low cost. Output bandwidth of broadcast equipment may also be optimized.

U.S. Pat. No. 6,718,552 to Goode issued Apr. 6, 2004 and entitled "Network bandwidth optimization by dynamic channel allocation" discloses an information delivery system which provides programming, such as video programming, by dynamically allocating the programming to channel slots, based on the availability of the channel slots. Programming with high viewership statistics is transmitted substantially continuously and programming with lower viewership statistics is transmitted "on-demand" in response to requests by users by way of a subscriber station. The subscriber stations maintain a map, provided by a corresponding session control manager, of currently available and currently transmitted channels. The information delivery system, in a preferred embodiment, takes the form of a Hybrid Fiber Coaxial system.

U.S. Pat. No. 7,207,055 to Hendricks et al. issued Apr. 17, 2007 and entitled "Bandwidth allocation for a television program delivery system" discloses a method for selecting specific programs from a plurality of programs, allocating the selected programs to a segment of bandwidth, and continuing to allocate the programs until all the programs are allocated or all of the available bandwidth is allocated. The programs may be selected based on a variety of different factors or combination of factors. The selected programs may also be prioritized so that higher priority programs are distributed before lower priority programs in case there is not enough bandwidth to transmit all of the programs. This invention allows a television program delivery system to prioritize a large number of television programs and distribute these programs based on their priority levels. The invention also permits a television program delivery system to dynamically allocate bandwidth over time or based on marketing information, such as consumer demand.

Still, other prior art discloses a variety of methods of reducing the amount of bandwidth that is needed to transmit content. For example, U.S. Pat. No. 7,336,787 to Unger et al. issued Feb. 26, 2008 and entitled "Critical packet partial encryption" discloses an encryption arrangement for multiple encryption of television programs. A system according to embodiments of the invention multiple-encrypts only a portion of the data required for full presentation of a television program to permit coexistence of multiple conditional access encryption systems associated with multiple manufacturer's set-top boxes within a single system. In one embodiment, only critical packets such as those carrying a payload incorporating packetized elementary stream header information is encrypted. By only encrypting a portion of the program, dramatically less bandwidth is consumed than the alternative of multiple encryption of all program data, thus permitting a larger number of programs to be carried over the same bandwidth while permitting coexistence of multiple conditional access systems in a single cable television system.

In spite of the foregoing approaches on how to manage bandwidth use and maximize bandwidth efficiency, there remains a salient need for a method and apparatus to address those situations where insufficient bandwidth exists to service all of the requests. There are no signs that the demand for bandwidth in content-based networks will subside over time due to, inter alia, increased penetration of high-definition services, etc. It is inevitable that, without increasing the infrastructure of the BSA network, there will come a time when extant bandwidth recovery methods will be an incomplete solution to the foregoing needs.

Previous solutions employed a rather simplistic and "coarse" technique; i.e., select a group of viewers that will have their service denied (based on Quality of Service agreements or the like) when there is insufficient bandwidth. But this solution is too "blunt"; some viewers would be denied their programs unnecessarily because it was unnecessary to recover their bandwidth. Or, conversely, a viewer would be denied their program because not enough bandwidth was recovered.

Hence, a more precise methods and apparatus for recovering bandwidth, especially in switched networks, is needed. Such improved methods and apparatus would ensure that enough bandwidth was recovered to satisfy viewer requests or alternatively, if enough bandwidth was not available and some viewers requests were denied, the number of viewers that were denied service would be minimized.

SUMMARY OF THE INVENTION

In a first aspect of the invention, a method of operating a switched content delivery network having a plurality of subscribers is disclosed. In one embodiment, the method comprises providing at least one of said subscribers with an escalating level of impact on services provided to that at least one subscriber based at least in part on a severity associated with a bandwidth deficit of said network.

In another embodiment, the method comprises performing a reclamation process, overflow process, and/or triage process in order to optimize network operation or achieve a desired operational or business goal.

In a second aspect, a network apparatus adapted for bandwidth recovery is disclosed.

In one embodiment, the apparatus comprises a network server (e.g., BSA hub server or the like) which is adapted to implement one or more of the forgoing processes.

In a third aspect, a computer program is disclosed that implements the foregoing processes. In one embodiment, the program is stored on a computer-readable medium (e.g., HDD of the aforementioned server, CD-ROM, floppy disk, program memory, etc.).

In a fourth aspect of the invention, consumer premises equipment (CPE) adapted for network bandwidth recovery is disclosed. In one embodiment, the CPE comprises a settop box that includes a client application adapted to issue and receive messages relating to the recovery process, as well as display and management of slates.

In a fifth aspect of the invention, an improved content delivery network is disclosed. In one embodiment, the network comprises a broadcast switched architecture (BSA) cable network that is adapted to perform bandwidth recovery, overflow, and/or triage processes.

BRIEF DESCRIPTION OF THE DRAWINGS

FIG. 2d is a logical flow chart illustrating a first exemplary implementation of the general method of FIG. 2a.

DETAILED DESCRIPTION OF THE INVENTION

Figure 1:
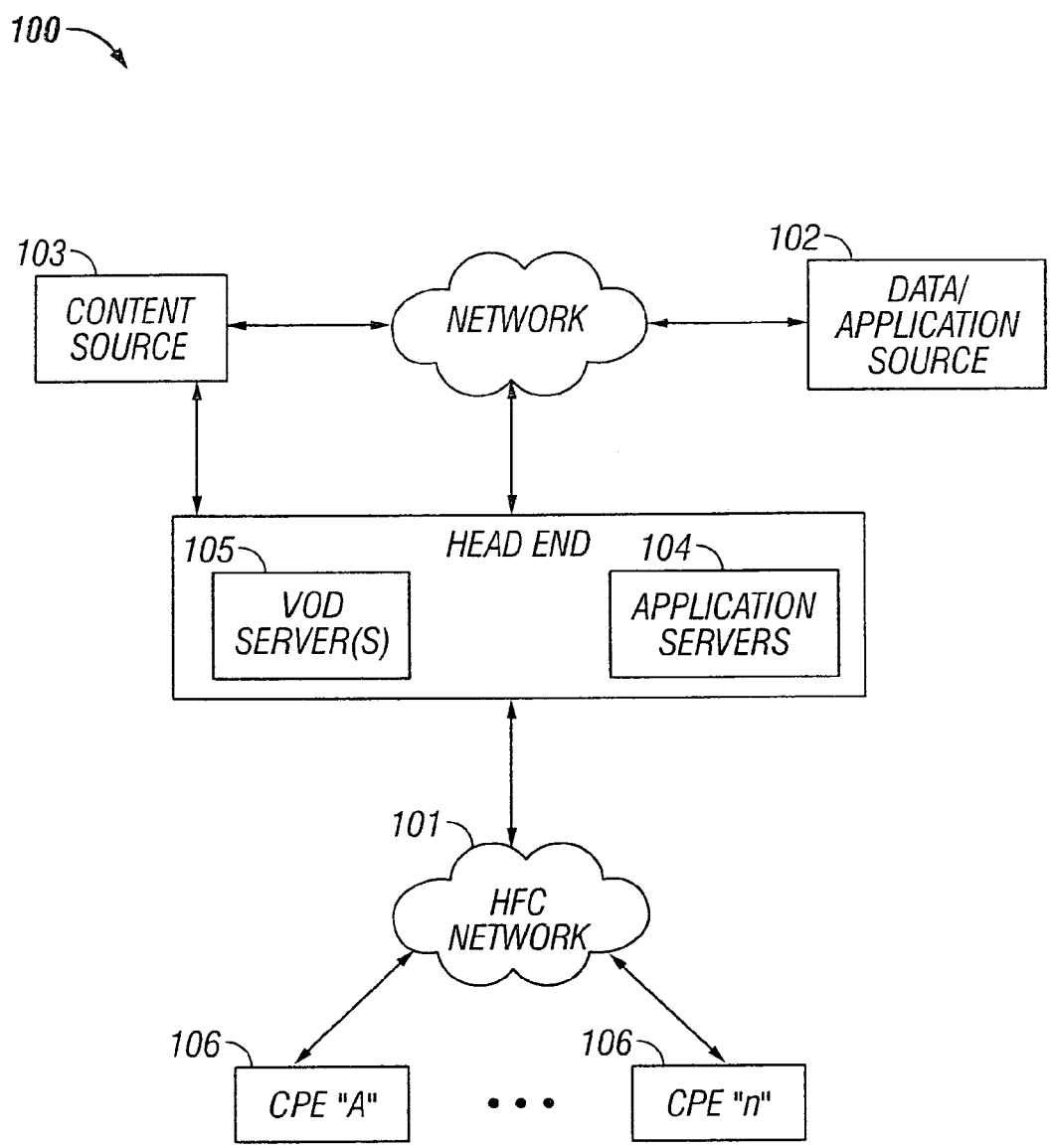
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™ or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGjiard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the terms "local" and "remote" refer generally to devices, entities, or users that are serviced by substantially different communications channels. These terms are intended to be relative, and bear no physical or absolute reference or connotation as to the placement of the communication channels or the served device, entities or users. For example, a "local" network may comprise the MSO cable or satellite network, whereas a "remote" network may comprise the Internet or a LAN/WAN/MAN, the latter which may literally serve the very same premises.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "modem" refers to any kind of modulation or demodulation process or apparatus including without limitation cable (e.g., DOCSIS compliant) modems, DSL modems, analog modems, and so forth.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, TCP/IP, H.323, etc.).

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), or IrDA families.

As used herein, the term "server" refers to any computerized component, system or entity regardless of form which is adapted to provide data, files, applications, content, or other services to one or more other devices or entities on a computer network.

As used herein, the term "WiFi" refers to, without limitation, any of the variants of IEEE-Std. 802.11 or related standards including 802.11a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one aspect, the present invention discloses improved methods of operating a switched content delivery network having a plurality of subscribers, wherein at least some of the network subscribers are provided with an escalating level of impact on their delivered services based at least in part on the severity associated with the bandwidth deficit of said network. As noted above, previous approaches to bandwidth management and reclamation employed a rather simple and coarse solution; i.e., select a group of viewers that will have their service denied when there is insufficient bandwidth. The present invention overcomes these deficiencies by providing, inter alia, more precise methods and apparatus for recovering bandwidth that ensure that enough bandwidth is recovered to satisfy viewer requests or alternatively, if enough bandwidth is not available and some viewers requests were denied, the impact (e.g., number of viewers that were denied service) is minimized.

The foregoing functionality is provided in one embodiment through use of three (3) primary processes: (i) a reclamation process; (ii) and overflow process; and (iii) a triage process. These three process are applied is a somewhat "tiered" hierarchy as needed in order to provide the aforementioned graded or escalating impact based on the severity of the bandwidth deficit. In this fashion, user experience is substantially maintained even under conditions of reclamation and bandwidth deficiency, and any degradation of such experience or service is progressive in nature.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture having an multi-system operator (MSO), digital networking capability, and plurality of client devices/CPE, the general principles and advantages of the invention may be extended to other types of networks and architectures where bandwidth allocation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system, or over a satellite or millimeter wave-based network.

It will also be appreciated that while described generally in the context of a network providing service to a consumer (i.e., home) end user domain, the present invention may be readily adapted to other types of environments including, e.g., commercial/enterprise, and government/military applications. Myriad other applications are possible.

It is further noted that while described primarily in the context of 6 MHz RF channels, the present invention is applicable to literally any frequency/bandwidth, such as for example 8 MHz channels.

Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband (UWB) systems. For example, in one variant of the invention, high-bandwidth UWB signals imposed atop the traditional QAMs of the cable network are used to provide a high-speed data download capability for the content to be utilized at the subscriber's premises (e.g., applications or archived data).

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

FIG. 1 illustrates a typical generalized content-based network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Exemplary embodiments of a "converged" CPE (i.e., CD) of the invention are also described subsequently herein.

Figure 1A:
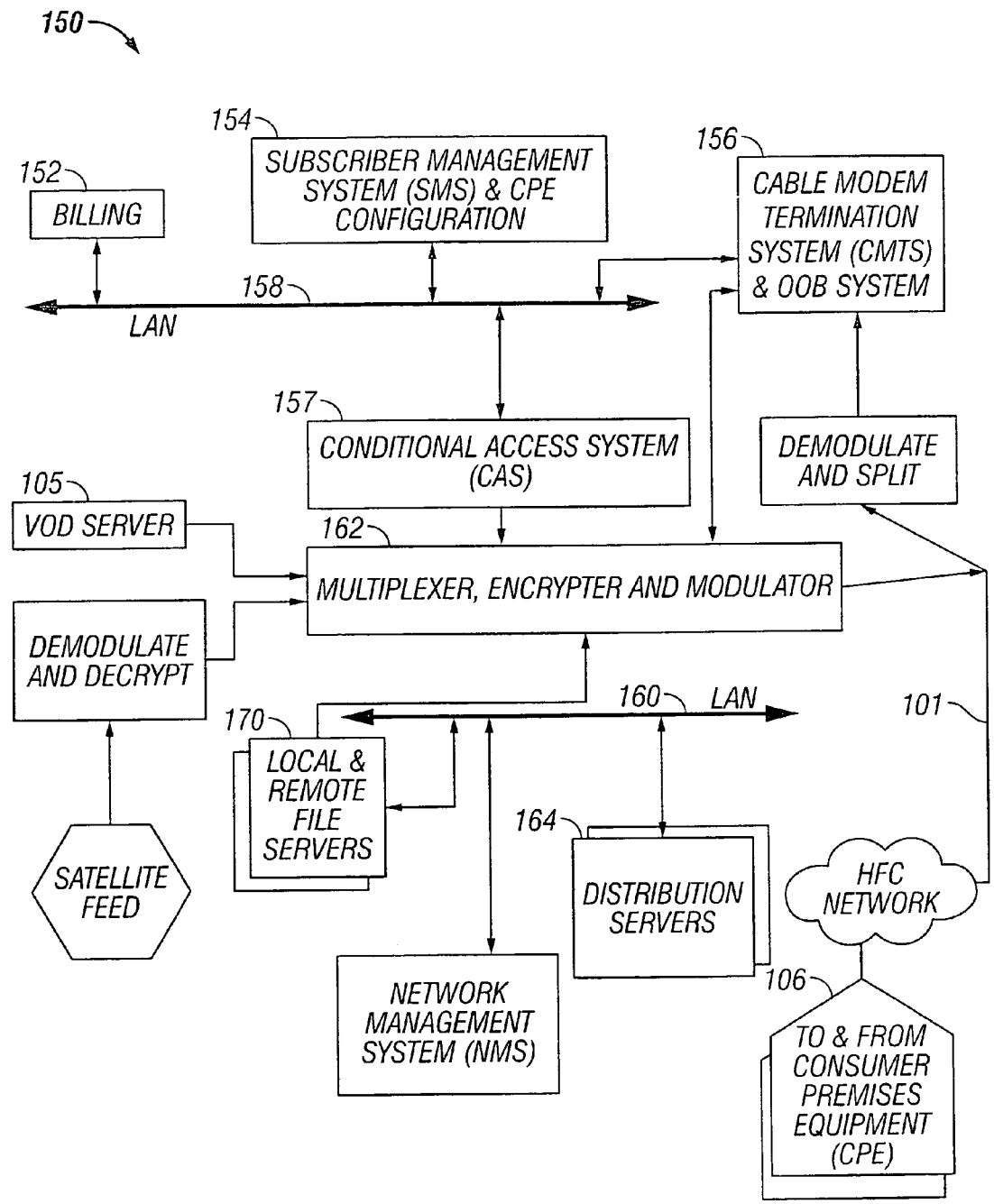
FIG. 1a is a functional block diagram illustrating one exemplary HFC cable network headend configuration useful with the present invention.

Referring now to FIG. 1*a*, one exemplary embodiment of a headend architecture useful with the present invention is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1*a* is high-level, conceptual architecture and that each MSO may have multiple headends deployed using custom architectures.

The architecture 150 of FIG. 1*a* further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1*b*) via a variety of interposed network components.

Content (e.g., audio, video, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
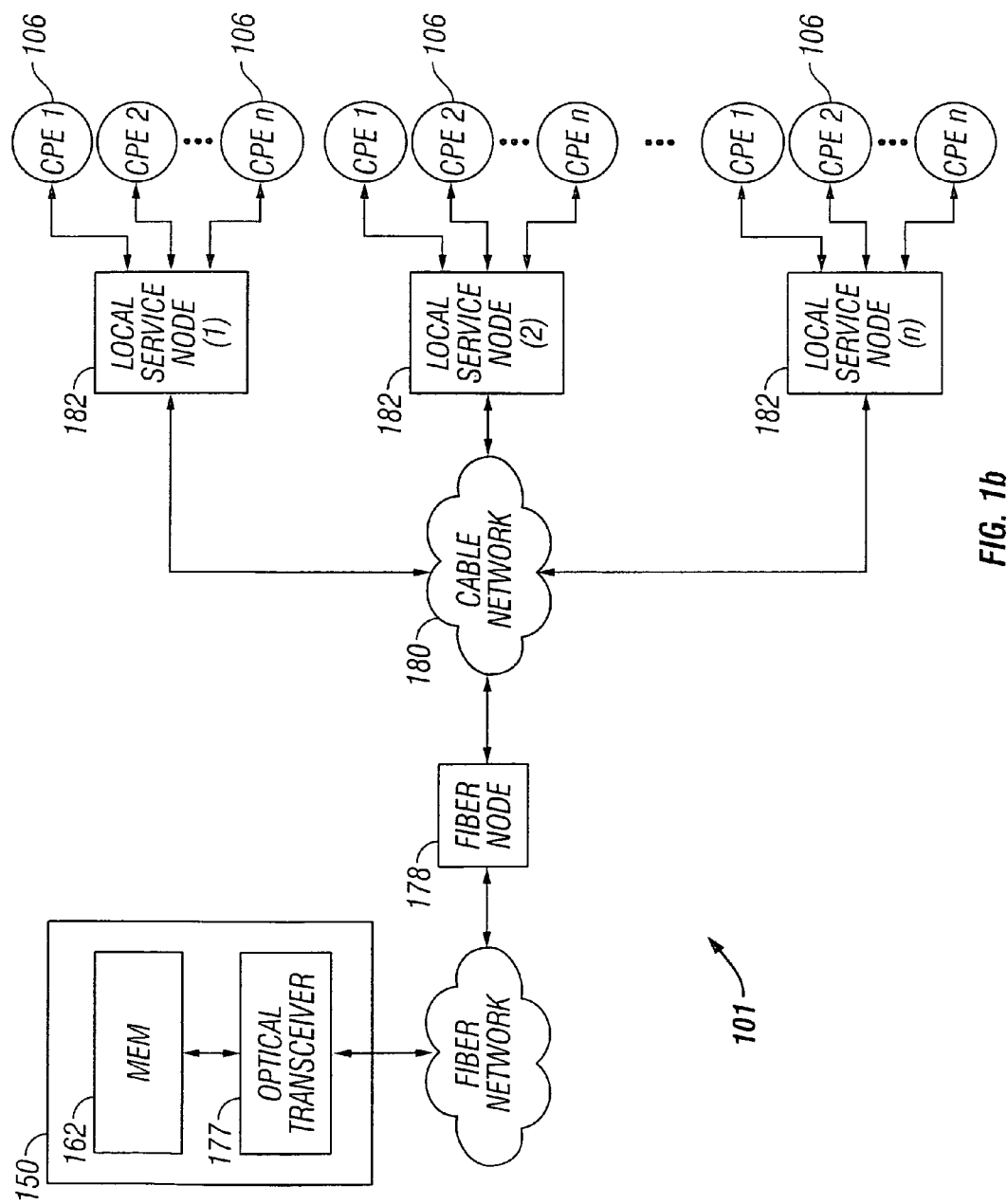
FIG. 1b is a functional block diagram illustrating one exemplary local service node configuration useful with the present invention.

As shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
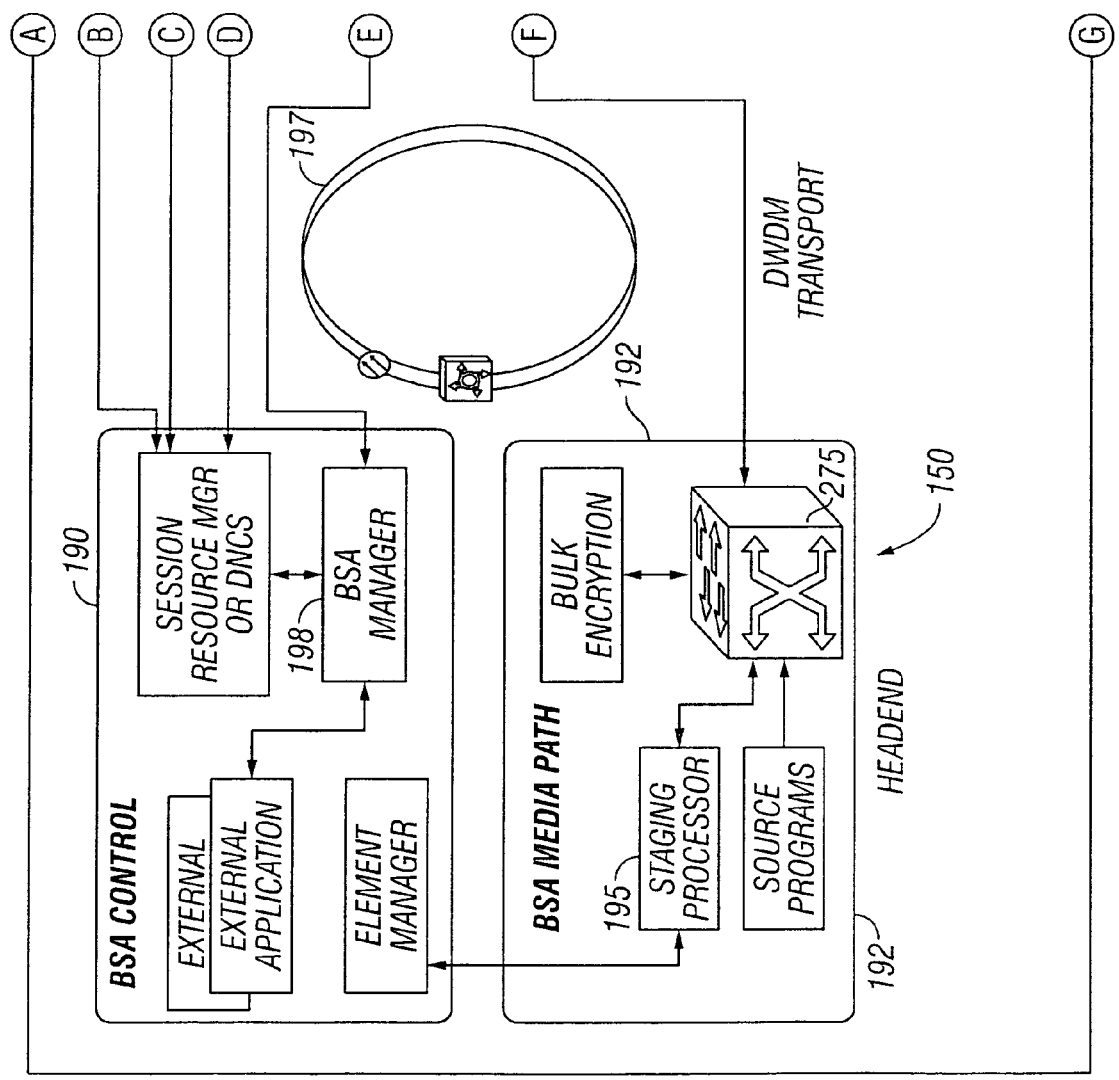
FIG. 1c is a functional block diagram illustrating one exemplary broadcast switched architecture (BSA) network useful with the present invention.
Figure 1C:
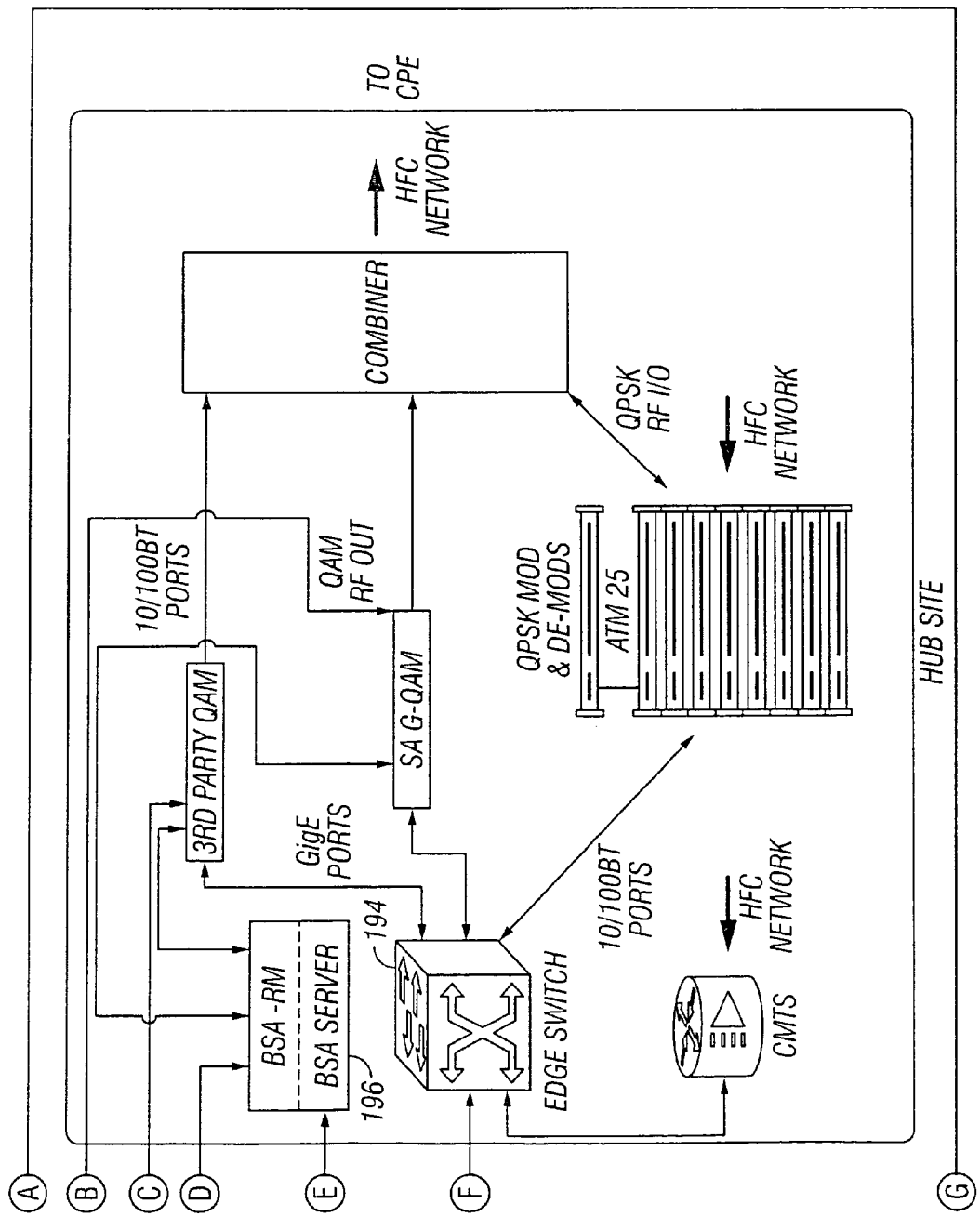

FIG. 1*c* illustrates an exemplary "switched" network architecture useful with the exemplary embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1*c* shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1*a*-1*c* can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while the exemplary embodiments presented herein are described in the context of Internet services that include multicast and unicast data, the present invention is applicable to other types of services that include multicast transmission of data delivered over a network having multiple physical channels or even virtual or logical channels. For example, switching between various physical channels that comprise a virtual channel, can itself be conducted according to the "switched" approach of the present invention. As a simple illustration, if a first virtual channel is comprised of physical channels (e.g., QAMs) A, B and D, and a second virtual channel is comprised of QAMs C, E and F, a CM or other CPE can be configured to switch between the A/B/D and C/E/F virtual channels as if they were a single QAM.

Reclamation Architecture and Methods—

Referring now to FIGS. 2-5, various embodiments of the reclamation apparatus and methods of the present invention are now described. While described in the exemplary context of "switched" architectures (e.g., BSA) of the type previously described herein with respect to FIG. 1c, it will be appreciated that the invention may be practiced using other network delivery paradigms.

Definitions and Concepts

In the context of the exemplary embodiments described herein, the following definitions and concepts are referenced:

GSRM: The exemplary embodiment of the Global Session and Resource Manager comprises a collection of software processes that together act as the master controller of a large-scale digital video distribution system. One of these processes manages the Physical Topology of the network. GSRM processes are well known to those of ordinary skill, and accordingly not described further herein (see, e.g., the Time Warner Cable GSRM Specification, incorporated herein by reference in its entirety, for details on exemplary implementations).

QAM Channel: In the exemplary embodiment, a 6 MHz-wide Quadrature Amplitude Modulated RF carrier. A QAM channel is output by a QAM modulator chassis to a group of subscribers. Each QAM channel is typically combined with other channels within and/or outside of the chassis to form an RF spectrum signal which is supplied to a subsection of the outside plant access network. A QAM channel may be designated by the GSRM as Off-line, Broadcast, or Narrowcast.

QAM Pool: A group of narrowcast QAM channels that are combined into a common RF signal prior to distribution to the outside plant access network.

Bandwidth (BW): Bandwidth is a physical resource space within a QAM pool, typically measured in Mbits/sec.

QAM Pool Partitioning: The QAM pool is typically partitioned by the GSRM into BSA-only, VoD-only, and Shareable sections. The following are exemplary boundary definitions.

(i) Low Water Mark: The portion of the QAM pool partitioned for BSA-only use.

(ii) Shareable Bandwidth: The portion of the QAM pool which is available to BSA and other services (typically VoD). Session-based encryption or encryption capable edge QAMs must be available for the shareable portion. "Clear" edge QAMs lacking encryption capability often must be provided with sufficient session based encryption resources to be included in the Shareable QAM pool portion. Note that other factors such as bulk encryption utilization, encryption resource sharing across multiple service groups, and the presence of non-encrypted VoD programs will often cause less than 100% encryption capability as being "sufficient". If sufficient encryption resources are not available, then clear QAMs are placed below the low water mark.

(iii) High Water Mark: Low Water Mark and Shareable Bandwidth combined. The QAM pool bandwidth above the High Water Mark is not available to BSA, and is typically reserved for VoD use only.

Partition boundaries may be placed for example on 6 MHz QAM channel edges or within a QAM channel under control of the GSRM. Partition bandwidth may be zero or non-zero.

The BW is specified by the GSRM for each partition. The GSRM also specifies the partition's QAM Transport Stream Identification numbers (TSIDs) which are associated with each 6 MHz RF QAM channel and its center frequency. A list of the BSA-only and shareable TSIDs is provided by the GSRM to the BSA Server at server initialization and whenever the list is modified.

SG (Service Group): A Service Group is a group of digital settops or CPE sharing a QAM pool. SG CPE are connected to a common subsection of the outside plant access network.

BSA Server: The BSA Server is the collection of software processes that control the binding and unbinding of streams to sessions, and manage the associated bandwidth. It is not a server in the sense that is does not directly handle media streams the way that a VoD server does. It may also be termed a Broadcast Switched Session and Resource Manager (BSA-SRM).

BSA Server session control and resource management functions are typically subservient to like processes in the GSRM. The BSA Server must request and be granted session (and therefore BW) workspace in each SG QAM pool. Sessions granted by the GSRM may be revoked by the GSRM.

In some implementations, the BSA Server also creates and updates the Mini-Carousel (MC) stream. The MC is an exemplary MPEG-2 compliant stream that is placed on each QAM channel partially or entirely within the Low Water Mark or Shareable Bandwidth partitions. See, e.g., the Time Warner Cable specification TWC-BSA-MCMIS-3_0, incorporated herein by reference in its entirety, for details on exemplary implementations.

Shell Session: A unit of GSRM-allocated bandwidth (BW) in the QAM pool requested by and granted to a BSA Server. Shell sessions are used to reserve the initial BSA Server-managed BW space, and to request additional temporary BW space. In the exemplary embodiment, the GSRM determines which QAM TSIDs (frequencies) that shell sessions are granted on. Each video program stream flowing in the QAM pool is bound to (associated with) one shell session.

Shell sessions granted by the GSRM may be revoked by the GSRM. This may consist of an immediate or negotiated revocation of a specific session or sessions, or as a general BW request for space in the Shareable Bandwidth partition currently under management of the BSA Server. See, e.g., Time Warner Cable SSP-SIS v2.4 specification, incorporated herein by reference in its entirety, for details on exemplary implementations.

Initial Shell Session Grant: At BSA Server initialization, numerous small shell sessions are requested and granted, after which the BSA Server can be considered the manager of that space. Shell session size defines the granular limit of Server BW management; therefore, shell sessions are typically much smaller than the programs they are bound to. The exemplary implementation of the BSA Server uses bound and un-bound shell sessions in combination as a record-keeping means to manage BW. The Initial Shell Session Grant typically reserves all of the space in the BSA-only Low Water Mark partition, and significant space in the Shareable Bandwidth partition.

BSA Overflow Shell Session Grant: A single shell session is requested by the BSA Server and granted by the GSRM for temporary use of space in the Shareable Bandwidth partition above the initial grant. Unlike the Initial Shell Session Grant, each BSA Overflow Shell Session is specified with a bandwidth size that exactly matches a specific BSA Server program stream need. Reclaim is, in the illustrated embodiment, attempted as soon as the associated program stream enters the aged state, and if successful, it is immediately relinquished to the GSRM.

Overflow Attribute: When an overflow shell session is granted, the Overflow Attribute is set in the stream table entry. When a stream with this attribute enters the aged state, the reclaim process will be immediately started at the "slate" step (see FIG. 2d herein). In phase one QAM sharing, BW of streams with the Overflow Attribute set cannot be re-purposed for internal BSA server needs, but may only be reclaimed for reversion of their bound sessions to the GSRM. In phase two QAM sharing, the GSRM will be able to request reversion of an overflow session, and the BSA server will use all processes at its disposal to execute the request based on priorities.

Last User Activity (LUA): The Last User Activity comprises a timestamp cached in the CPE. The timestamp value reflects the last time that a key was pressed on the remote or CPE, or the last time a DVR recording was automatically started. LUAs are forwarded to the BSA-RM periodically. LUA values that did not change may not be forwarded. LUAs are sent for tuners viewing both BSA and non-BSA program streams. Non-BSA program LUAs are useful for, inter alia, database purposes and tuner database synchronization.

Slate: A barker or other message with text from the CPE image which is called up by number by the BSA client software for on-screen display. A slate is overlaid on the video display, typically across the bottom portion of the screen. The appearance of the text display is subject to navigator software control. A typical slate text message is "Please press the select key to continue viewing this program." The client determines under what conditions to display the slate, e.g. a slate is typically not added to a DVR recording.

Slate Time-out: The time interval that the slate is displayed before being removed by the client software. This interval value is provided to the client at initialization. The interval value is typically on the order of five minutes, and is intended to allow a viewer sufficient time to return from non-viewing activity (e.g. during a commercial break) and act upon the message.

Teardown: The un-binding of a program stream from the associated shell session, freeing the shell session (and the associated BSA Server managed BW) for other bindings.

Retry Count: The number of times the client or server will attempt to resend a message without acknowledgment. The retry count value is known to the server, and provided from the server to the client at client initialization. All messages are subject to the Retry Count with the exception of the Client initialization message, which continues to be sent periodically until acknowledged.

Retry Back-off: The amount of time between retries. The Retry Back-off value is known to the server, and provided from the server to the client at client initialization.

Program Time-out: The Program Time-out value is a programmer- and SG-specific elapsed time value, used by the server in the stream reclaim process. The program time-out may be set to a default value of four hours, although other values may be used. The time-out may be subsequently reduced, but should generally be set to a value longer than the longest expected single-event time, such as longer than the longest movie or sporting event expected in that program stream. The program time-out value is provided to the BSA Server via the BSA Manager and is not known to the client in the exemplary implementation. Shorter program time-out values will increase the number of aged streams available for reclaim, but may cause an increase in slate responses. Viewing behavior data may be analyzed, and produces a determination of the optimum default time-out value for each programmer. These values may be distributed to network operations as available. Implementations may also include instrumentation to dynamically adjust program time-out values as a function of e.g., one or more network, operational, or business-related parameters.

Tuner Table: A database object maintained by the BSA Server organized by stream. Each stream has a list of tuners. A tuner list is maintained for every stream, including BSA and non-BSA (including analog) streams. Non-BSA programs are included for viewership statistics and tuner synchronization purposes.

Each possible stream is listed, including a separate entry for each unique version of a Source ID, and analog channels, even if the tuner count in that stream is zero.

The BSA tuner list includes each tuner's LUA timestamp and state (Active, Aged, Slate in Progress, Slated, or Program Not Available) and grade of service (un-graded, Prime, or SuperUser). Non-BSA streams include LUA timestamps, and non-responding status is considered a "stream" and contains a list of non-responding tuners. Inactive status is considered a "stream" and contains a list of inactive tuners.

Stream (Program Number) Table: The Stream Table is a database object in the BSA Server, organized by TSID. Only BSA streams are listed. For each TSID, Program Numbers of currently streaming programs are listed with their associated Source IDs and shell session IDs. Multiple program numbers may be associated with the same source ID, such as in the case of multiple bit rates during transitions to and from higher or lower bit rate versions of the same program, or for targeted advertising, or for multiple codec use. When multiple versions are present in the QAM pool, each version will include its assigned (TBD) unique index number. The Stream Table also keeps track of current stream states and the Overflow Attribute.

Program (Source ID) Table: The Program Table is a database object in the BSA Server, organized by Source ID. All offered BSA programs are listed, as are all non-BSA programs. For BSA programs, there may be multiple copies for each Source ID. Each copy is listed, including its clamped bitrate and (TBD) index number and (TBD) text description. For non-BSA programs, only the text description is included in the listing.

Triage: A situation where the server must perform a stream teardown without slating the stream. Triage is an option in cases where there the server has exhausted its BW workspace and demands accumulate faster than the slating process can reclaim BW. In the exemplary configuration, triage is performed after the priority system defined by business rules has been consulted and results in the BSA server being directed to tear down a stream in favor of a higher priority demand for that stream's bandwidth space in the QAM pool.

Reclamation: The process of priority-based stream selection, slating, and stream state manipulation used to increase the size of the server's Reclaimed Stream Workspace (RSW). Once the Reclamation process is started for a selected stream, it is allowed to run for the duration of the slate Time-out value.

Defragmentation and Contiguous BW: The term fragmentation, as used in the context of hard disk drive file management systems, is generally analogous to the meaning of this term in the present context. Unlike disk files, however, video program streams typically cannot be linked across non-contiguous resource segments—all PIDs in a program number must be present on the same TSID. In the BSA context, any BW on the same TSID is considered contiguous.

Defragmentation is the process whereby streams are relocated from one TSID to another within the QAM pool, for the purpose of consolidating contiguous BW such that higher BW (e.g. HDTV) program streams are not denied carriage. It is a separate process from reclamation, in that no tuners are denied viewing regardless of state. Defragmentation may cause a momentary picture artifact. The defragmentation process behavior is closely coordinated with reclamation process behavior.

Defragmentation prioritizes TSID moves according to factors such as grade of service, number of tuners, and LUA age. Defragmentation needs can be reduced somewhat (but not eliminated) though intelligent program stream to TSID assignments (packing algorithms) in the server.

GSRM BW request: An external BW request made by the GSRM to the BSA Server. A GSRM BW request is made in one exemplary embodiment according to one or more business policies or business rules, and may subject to a priority system or algorithm if desired.

Proactive BW request: An internal BW request made by the BSA server to its own workspace. Individual Proactive BW requests are specifically directed by business rules, and are not associated with a client viewing. An example usage is to bind streams to sessions in a predictive manner such that non-responding settops are able to view popular programs during certain times-of-day or days-of-week. Proactive requests may also be used to speed channel change times by pre-binding streams, therefore forcing program tuning information into the MC. Proactive BW requests do not invoke the BSA overflow shell session request process or the Triage process.

Server Stream States and Associated System Behavior

The following stream states are utilized in the exemplary embodiment of the invention:

Static: A stream set to Static in the BSA-RM (through manual entry or via business rules) will be continually broadcast in the QAM pool of the SG as long as set to that state. Static streams are not available for reclaim and therefore cannot be slated. The BW occupied by Static streams represents an effective reduction of the QAM pool size. This size reduction may be applied to the Shareable BW portion only, then the BSA only portion provided that BW remains available below the low water mark for the sum total BW of all programs assigned a Non-Blocking grade of service. The amount of BW above the high water mark may not be included and thereby, in conjunction with non-blocking grade of service program BW imposes a limit on static stream BW above which no further streams may be assigned to that state. Static state assignment failures may be reported and actions taken to restrict the number of Static programs and/or SuperUser tuners that are allowed in that SG. Streams may be set and un-set to Static under various business rules such as time-of-day, day-of-week, and SG-specific dependencies. If a stream is set to Static, no other stream state applies. Any BSAProgramSelectRequest made by a tuner with a SuperUser grade of service will cause the requested program stream to be placed in the Static state. BSA Query should be used to periodically verify that the SuperUser tuner is still tuned to the stream. The Static state is intended for diagnostic and corner case problem solving only and should be assigned with great care. The server may continue to track states of tuners in Static streams.

Active: A program stream is considered Active if at least one tuner is in the BSA Server's Tuner Table is Active, and the stream is not in the static state.

Aged: A program stream is considered Aged when all tuners listed in the server's Tuner Table are Aged or Slated. A program stream first becomes Aged when the last remaining Active tuner moves to the Aged state (its most recent LUA value becomes older than the currently viewed program's time-out value for that SG). An Aged stream has at least one tuner in the Tuner Table.

Vacant: A vacant stream is a program stream where all tuners are known to have tuned away, but is still being allowed to flow. The Tuner Table contains zero entries for that program number. Bandwidth occupied by vacant streams should be considered by the BSA Server when making workspace decisions. A Vacant stream may be currently viewed by non-responding settops.

Slate in Progress: The BSAEventIndication message has been sent to all tuners of record, the Slate is currently being displayed, and the Slate Time-out interval is counting down while the client is waiting for user activity. If and when user activity is detected, a LUA will be immediately sent and the Slate message removed. The Slate will stay up until a LUA is sent or the Slate Time-out interval expires. All tuners in the Tuner Table for that program number are marked as Slate in Progress. If a LUA is received, the stream state changes to active. If the slate times out, the stream state changes to Reclaimed, and the stream will continue to flow until its BW is needed.

Reclaimed: A program stream is considered reclaimed when it has been tested and qualified by the BSA Server as having no active viewers via the reclamation process. Reclaimed streams continue to flow and occupy BW space in the QAM pool. A Reclaimed stream may be currently viewed by non-responding settops. All tuners in the Tuner Table for that program number are marked as Slated.

Server Bandwidth Workspace Components

Reclaimed Stream Workspace (RSW): The total BW of program stream(s) in the server-managed Initial Shell Session Grant portion of the QAM pool that have been reclaimed (previously qualified as unviewed) using the slating process. These streams show at least one tuner in the Tuner Table. All tuners in the table are marked as Slated. These streams are available for immediate teardown subject to business rules.

Vacant Stream Workspace (VSW): The total BW of program stream(s) in the server-managed Initial Shell Session Grant portion of the QAM pool with zero tuners in the Tuner Table. Either all tuners are believed to have tuned away or powered down, or the stream has been proactively bound under direction of business rules. These streams are available for immediate teardown subject to business rules.

Unused Bandwidth Workspace (UBW): The total BW of shell sessions in the server-managed Initial Shell Session Grant portion of the QAM pool that is not associated with bound program streams. This is a side effect of imperfect TSID packing.

Tuner Grades of Service

The following tuner grades of service are used with the exemplary embodiments:

Un-graded: No grade of service has been assigned and grade is not considered in the reclaim, overflow shell session request, or triage processes.

Prime: A tuner may be assigned to the Prime grade of service via manual means, system controls, or business rules. This assignment may be subject to a time-of-day/day-of-week mask and may be program-specific or universal. The server will not attempt reclamation of a stream containing one or more Prime grade tuners unless there are no other reclaim candidate streams with fewer Prime grade tuners. The client is not made aware of tuner grade of service.

SuperUser: A tuner may be assigned to the SuperUser grade of service via manual means, system controls, or business rules. This assignment may be subject to a time-of-day/day-of-week mask and may be program-specific or universal. A stream initiated by a tuner of SuperUser grade (or the stream being viewed when the tuner is assigned that grade) will be changed to and remain in the static state until the SuperUser grade tuner tunes away or changes to the inactive, non-responder, or program not available state. Static streams by definition cannot be slated. A typical application for the SuperUser grade is to insure that a specific tuner (i.e. in a sports bar) is always able to select a program, and that the viewing of any thus-selected program will continue without interruption until a different program is selected, the settop is powered down, or the tuner's grade of service is changed. The BSAQueryRequest may be periodically used to verify the status of each SuperUser tuner. The client is not made aware of tuner grade of service. The SuperUser grade is intended for diagnostic and corner case problem solving only and should be assigned with great care.

Tuner States and Associated System Behavior

The following tuner states are used:

Non-BSA, Server Perspective: A Non-BSA tuner is any tuner listed in the Tuner Table as being tuned to a non-BSA program.

Non-BSA, Client Perspective: A Non-BSA tuner is any tuner currently tuned to a non-BSA program.

Non-Responding, Server Perspective: Any tuner that has been repeatedly sent the same message for the retry count and has not been acknowledged. A tuner will remain in this state until an acknowledgement has been received from it, even if client-originated messages have been received. Note that a tuner has to have initialized in the past to be known to the server. Reporting and scrubbing of non-responding tuners may be periodically performed including service calls if necessary. There is a potential corner case where messages originated by the client are received but the client does not acknowledge server originated messages. This may indicate problems with the forward communications link to the client, and must be reported by the server. If a message is received from a non-responding client, the BSA QueryRequest message may be sent to confirm a working forward link. When the server moves a tuner to the Non-responding state, it also removes it from the current stream in the tuner table and adds it to the "non-responding" stream.

Non-Responding, Client Perspective: Any tuner that has repeatedly sent the same message for the retry count and has not been acknowledged. Also included are clients that have never initialized. A tuner will remain in this state until an acknowledgement has been received, even if other messages are received from the server.

Inactive, Server Perspective: A tuner is not known to the server unless it has initialized. Tuners that have initialized but have never been directed to tune any program other than the default program are considered inactive. In multiple tuner settops, tuners that have never been asked to tune are considered inactive, as are tuners that were used for a scheduled recording that has been completed. Tuners in a powered-down settop are considered inactive.

Inactive, Client Perspective: The client considers a tuner to be inactive if the tuner is not currently viewing or recording a program, and is not in Program Not Available or Non-responder states. Tuners with extremely old LUAs may also be moved to the Inactive state under vendor discretion or according to business rules.

Active, Server Perspective: An active tuner is a tuner on an BSA program in the Tuner Table with a LUA younger than the per-SG program time-out value.

Active, Client perspective: A tuner is considered active if currently tuned to a valid BSA program stream. This includes tuners that the server considers Aged.

Aged, Server Perspective Only Applies: A tuner is considered Aged when its LUA value in the Tuner Table is older than the Program Time-out Value. The BSAEventIndication message has not yet been sent.

Slate in Progress, Server and Client Perspectives: The Slate is currently being displayed. Both sides are aware of the Slate time-out value.

Slated, Server and Client Perspectives: The Slate was displayed and the Slate time-out interval has expired, and there has been no further user activity.

Program Not Available, Server Perspective: A tuner is in the Program Not Available state after teardown of the currently viewed stream. The server will move the tuner to the Program Not Available tuner list in the Tuner Table. The server will attempt recovery of Program Not Available tuners in the tuner scrubbing process.

Program Not Available, Client Perspective: A tuner is in the Program Not Available state after teardown of the currently viewed stream or after any failure to tune the requested stream. The client will display the "Program Not Available" full-screen barker message with screensaver to prevent display burn-in.

Orphaned, Server Perspective Only Applies: An Orphan tuner is a tuner listed in the Tuner Table, but in fact it is tuned elsewhere, inactive, or non-responsive. Tuners that have really old LUAs but are still in fact tuned to a program (as verified by their response) are not considered Orphans. Orphan tuners are removed from or moved within the Tuner Table as soon as they are discovered, such as during the tuner scrubbing process. If all tuners in the Tuner Table of an Aged stream program are found to be orphans as a result of the scrubbing process, the stream is changed from Aged to Vacant. The Orphaned tuner state is useful for diagnostic purposes. It is generally not possible to determine how long a tuner has been in the Orphaned state, but the time is bounded by its stored LUA value.

Bandwidth Recovery

A BSA system must recover bandwidth to operate. If BW is not recovered, the QAM pool will become clogged with stale streams—streams with tuners but no viewers. Viewership qualification and bandwidth recovery are what makes BSA to stand apart from simple multicast systems. Viewership must be qualified in a respectful way to derive the greatest benefit to all viewers.

The BSA system should be efficient and robust in the face of oversubscription pressure. However, betterment of these goals must be considered in the context of a transparent user experience. Ideally, the subscriber is not aware of any difference between BSA program viewing and broadcast program viewing.

A ready amount of bandwidth workspace makes possible rapid stream setup for fast response to program viewing requests. The most desirable and frequent means to build and maintain this workspace is through tuner tracking. The workspace grows when viewers vacate the BSA pool by tuning away or turning off their settops.

When this technique alone is not sufficient, bandwidth recovery processes are used. In the great majority of cases, operation of these processes will advantageously not be known to the subscriber.

Program streams are allowed to continue to flow even when all known tuners have tuned away. These streams may be being viewed by non-responding clients that do not have upstream connections. This technique makes the system more robust, in that loss of two-way connectivity appears to the customer as a partial loss of programming, not a complete outage.

The Four Subscriber Events

When the subscriber must be affected, one approach of the invention uses an escalating impact based on the severity of the BW deficit. In the exemplary embodiment, there are four ways the subscriber is impacted:

1. Slating is the settop output of the prompt "Press Select Key to Continue Viewing." Slates are typically displayed over active video e.g., at the bottom of the screen. A response to a slate will typically prevent removal of the program stream. A slate outputted but not viewed is not a concern (such as when the TV is off). However, slates that generate responses are somewhat intrusive, and typically should be minimized. A properly operating BSA system will minimize slating. In order to improve the performance of the system in this respect, slating activity may be reported on both a per-event (programmer, service group, timestamp) and per tuner (tuners slated, LUAs received, LUA timestamps) basis. The BSA server and BSA Manager may provide this capability. Only slates with active responses must be reported.

2. Defragmentation of the QAM pool is occasionally needed to create room for a HD program, for instance. This process produces a temporary picture artifact lasting from a half-second to as long as two seconds, and as such is typically only be used when the alternative is to deny viewing.

3. In the extremely rare case where a BSA system is inundated with BW demands that it cannot satisfy, it becomes necessary to choose between programmers that get carriage and ones that do not. This is the triage process. A customer may receive the message "Program not Available" or the like during the course of normal viewing as the viewed program is triaged in favor of a program that is either more popular or has been assigned a higher grade of service. See also co-owned an co-pending U.S. patent application Ser. No. 11/706,620 entitled "METHODS AND APPARATUS FOR CONTENT DELIVERY NOTIFICATION AND MANAGEMENT", filed Feb. 14, 2007, incorporated herein by reference in its entirety, for exemplary content delivery and notification methods and apparatus.

4. A viewing request may be denied with the "Program not Available" message displayed in place of the desired program. This is referred to as Blocking.

Subscriber Event Instrumentation and Reporting Required:

The BSA server produces statistics on these four events (slate responses, defragmentation moves, triage, and blocking). A record may be produced for each occurrence, including the program, time, service group, and number of tuners impacted. The frequency of these events may also advantageously be used to guide modifications to the BSA system, such as by adding QAM channels or reducing service group size.

Priorities and Processes used to Minimize Subscriber Events:

These four events are rare in a properly engineered system. However, they play important functions in the behavior of the system in "corner case" situations such as over-subscription pressure. A prioritization system and three processes have been developed to minimize the necessity of these rare events: (i) Program Grades of Service; (ii) The Reclamation Process; (iii) The BSA Shell Session Overflow Request Process; and (iv) The Triage Process. These topics are now described in detail.

(i) Program Grades of Service

Program grades of service are established to facilitate stream prioritization in the Reclamation Process, Triage Process, and the Defragmentation Process. Higher grades of service provide the program stream greater protection from (avoidance of) the effects and activities of all three processes.

All grades of service are subject to the Reclamation Process and slating. If a program is to be protected from slating it must be placed in the Static state. A program in the Static state is not subject to reclaim or triage regardless of grade of service.

Each source ID (program) must be assigned a service grade. The selected grades are assigned for various business reasons. Assignments are input via the BSA Manager and implemented by the BSA Server, although in some cases the Server may dynamically re-assign grades of service according to e.g., operational or business rules.

Non-Blocking: This assignment requires that whenever the program is requested it will be made available to the subscriber. Program streams with a Non-Blocking grade of service are not subject to Triage. Other program streams will be triaged if necessary to make BW available, including Non-Triage programs in extreme situations. Non-Blocking is the highest grade of service. The total BW of programs that are assigned a Non-Blocking grade of service in a SG must be able to fit below the low water mark.

Non-Triage: This assignment requires that whenever the program is requested it will be made available to the subscriber, provided that it is not necessary to triage a program at the Non-Triage or Non-Blocking service grade. Program streams with lower grades will be triaged if necessary to make BW available with no regard to the number of tuners in their tuner tables. Non-Triage is lower than Non-Blocking. A Non-Triage service program stream is not subject to triage other than the above Non-Blocking exception.

A: This assignment requires that whenever the program is requested it will be made available provided it is not necessary to triage a program at an equal or higher service grade. If BW is required for a program stream with the A service grade, Utility grade program streams will be triaged regardless of the number of active tuners in their tuner table. If Utility grade program streams are not available for triage, Normal grade program streams will be triaged provided that they have only one active tuner in their tuner table. Grade A is lower than Non-Blocking and Non-Triage.

Normal: This assignment requires that whenever the program is requested it will be made available provided it is not necessary to triage a program at an equal or higher service grade. Utility grade program streams will be triaged to make BW space for Normal grade program streams regardless of the number of active tuners in the Utility grade program's tuner table.

Utility: This assignment requires that whenever the program is requested it will be made available if there is sufficient BW workspace or if a GSRM BW request is granted.

Reclamation Process Background:

The Reclaim Process is used for replenishment of the server BW workspace during normal operation, and is the primary bandwidth recovery technique. This process centers largely around program time-out timers, the BSA server's Tuner Tables, and display of the slate barker message prompt by the settop.

The Reclaim Process may be invoked on an individual program stream or simultaneously on multiple streams. Simultaneous execution is performed when the Server BW workspace is depleted by an amount greater than one stream, in response to a need for contiguous BW (such as to address fragmentation), or in anticipation of a demand pattern at the discretion of the Server vendor.

In cases where the Server BW workspace is fragmented, the server will need to prioritize reclamation such that sufficient contiguous (single TSID) BW is made available. The determination of what constitutes sufficient contiguous BW is left to the discretion of the Server vendor. Fragmentation will dictate which Aged streams are candidates for reclaim. Within the Reclamation Process, grade of service is secondary to fragmentation, but does function to guide the selection of streams after fragmentation is addressed.

For example, let us assume that a server has determined that there are too few contiguous BW sections as per the Vendor's discretionary BW workspace rules. The server will then review all TSIDs for the availability of Aged streams. The server will select one or more Aged streams for reclaim based on the contiguous BW workspace shortfall. If there are multiple options, grade of service can be used to help select the candidate streams.

The Reclamation Process alone is not adequate to address all TSID fragmentation issues, but instead must work in a coordinated fashion with the Defragmentation Process. However, since the Reclamation Process is potentially invisible to the viewer, it should be exhausted prior to invoking the Defragmentation Process.

Defragmentation is a separate process from reclamation in that no tuner in any state is denied viewing, since actively viewed streams are not removed but instead relocated to a new TSID. It also does not have to wait for a slate time-out interval, so is well suited to address immediate needs. Defragmentation process behavior must be closely coordinated with Reclamation process behavior. Defragmentation can prioritize TSID moves according to factors such as grade of service, number of tuners, and LUA age. Defragmentation needs can be reduced somewhat (but not eliminated) though intelligent program stream to TSID assignments (packing algorithms) in the server.

Program streams in the Static state are not considered part of the QAM pool and are thus not subject to the Reclamation Process.

Slating Background:

The primary reason to request a Slate display via the BSAEventIndication message is to address a current or anticipated shortfall in the Server BW workspace. If there is no workspace shortfall situation, slate messages are not displayed. The exemplary implementation doesn't attempt to qualify inactivity in a stream that will continue to flow. A viewer absent one minute may miss the slate display, and return to see a "Program not Available" message if the viewed stream is prematurely torn down. Unnecessary reclamation and the associated teardown can make the system appear user-hostile.

PVR Recordings not Slated: The special case of not slating a recording is in the exemplary embodiments performed out of courtesy to the subscriber, not utility. The actively viewed "main viewing screen" may be slated when a recording is in progress, but not the recording itself. The slate message will not appear during playback, thus preventing potential customer confusion and irritation. This behavior is put under control of the client software; however, other approaches may be used as well.

Slating and viewership data gathering: Viewership data is a by-product of BSA system operation—it should not be gathered if it negatively impacts the viewer unless there is a compelling business or operational reason. If the goal were to be acquisition of precise program viewing qualification for advertising sales, one could develop an interface into the BSA Server that would allow specific tuners to be independently slated (perhaps randomly, or opt-in); the data could then be sold and/or used by network operators. No extra client application is required.

Slating for diagnostic purposes: During the course of continuing system development and testing, including code revision testing, it is advantageous to be able to control slating activity on an individual tuner level. The BSA Server provides this diagnostic capability.

Slating for tuner scrubbing: The slating capability may be used in for periodic identification and clearing of tuners that are listed in the BSA Server Tuner Table. This scrubbing process removes tuners from the tuner table that respond to the BSAQueryRequest as being tuned and having a working upstream link, but have aged far past the program timer value. For instance, a tuner may be shown in a program table for 12 hours with no LUA activity. Even though a query shows that the tuner is still tuned, the BSA Server (under vendor discretion or subject to external business rules) will slate the stream, and if no response is received, move the tuner to the Inactive state.

(ii) The Reclamation Process

For Aged program streams of all service grades, the exemplary server embodiment attempts to reclaim according to the following rules:

1. In phase one QAM sharing, streams with the Overflow Attribute set cannot be reclaimed except as part of the BSA Overflow Shell Session process.
2. Pre-select candidate TSIDs only where fragmentation is to be addressed.
3. Do not attempt reclaim of a stream with one or more tuners with a Prime grade of service in that stream's tuner table unless all streams have Prime tuners. If all candidate streams have Prime tuners, select the one with the fewest. To choose between equal numbers, select the stream based on LUA value; compare the most recent LUAs in the two streams and attempt reclaim of the stream with the older LUA.
4. Identify the streams at the lowest service grade.
5. Within that service grade, select the Aged program stream with the smallest number of Aged tuners in the tuner table.
6. If the numbers of Aged tuners are identical, select the Aged program stream based on LUA value; compare the most recent LUAs in the two streams and attempt reclaim of the stream with the older LUA.
7. Start the slating process by sending the BSAEventIndication message to tuners in the Aged state as listed in the selected program stream's Tuner Table. This moves these tuners to the Slate in Progress state.
8. If no BSAEventResponse is received within the retry back-off period, it may be sent again to that individual client. This is attempted for the retry count value, after which the tuner failing to respond is changed to the Non-responder state.
9. If an BSA UserActivityReport message is received, that tuner's state is changed to Active in the Server. The Slate barker display is allowed to continue on each tuner in the tuner table (under client control) until either an BSA UserActivityReport message is received or the Slate time-out expires. For each BSAUserActivityReport message received, that tuner's state is changed to Active in the Server. When the Slate Time-out expires, each remaining tuner's state is changed from Slate in Progress to Slated in the server. Once started, the slating process is allowed to continue to run until all responding tuners in the tuner table are moved to Active or Slated states. The client directs removal of the Slate barker message after the Slate time-out expires.

10. If the Slate time-out expires and no tuners in the tuner table have sent the BSA UserActivityReport message, the stream state is changed to Reclaimed and the associated BW is added to the RSW.
11. As soon as the first BSA UserActivityReport message is received, the reclaim process is restarted with selection of another stream, even though Slate barkers continue to be displayed on some tuners.
12. The stream selection and slating process is attempted for each Aged program stream in turn. If all Aged program streams respond with BSA UserActivityReport messages, the RSW may be allowed to decrease below the Server's internal criteria.
13. As long as the RSW remains below the Server's internal criteria, the slating process is re-started on a stream as soon as that stream enters the Aged state.

(iii) The BSA Overflow Shell Session Request Process (Phase 1 QAM Sharing):
1. If the Server receives an BSAProgramSelectRequest that cannot be satisfied within the Server BW workspace, then a request for a single shell session may be made by the Server to the GSRM.
2. This request may be equal in BW to the program stream needed.
3. If granted, the BSA Overflow session may be tracked by the server and reclaimed as soon as the program stream enters the Aged state, regardless of RSW needs.
4. If reclaim of the BSA Overflow session is successful, the stream may be immediately torn down and the session proactively rescinded to the GSRM.
5. If reclaim is not successful, it will continue to be attempted each time the stream reenters the Aged state.
6. If the GSRM cannot or will not grant the BSA Overflow session request, triage may be performed by the Server.
7. Techniques are being developed that involve selection and movement of viewing to lower rate streams to make BW available, tuner qualification and movement of viewing to alternate codecs where STB capabilities allow, and potentially, forced downward resolution of a program stream from HD to SD. As these techniques mature, a separate document will provide details on their application to the BSA system. Application of such techniques is likely to be required after the GSRM Shell Session BSA Overflow Request Process is exhausted but prior to invocation of the Triage Process.
8. The BSA Overflow request process is also known as Phase 1 QAM Sharing.
9. In cases where the BW demand originates from the GSRM, the BSA Overflow Request Process may not be invoked.
10. The GSRM-initiated request process is also known as Phase 2 QAM sharing.

(iv) The Triage Process

In the exemplary embodiment, the Triage Process is more rarely used, and exists primarily for "corner case" resolution when for various reasons the BSA server is unable to keep up with BW demands.

If the Server BW workspace is depleted and the GSRM BSA Overflow Request is denied or does not apply, and other techniques are not available, the BSA Server may invoke the Triage process. In a triage situation, program stream tear-down is performed immediately without viewer notification. The exemplary variant of the Triage process proceeds as follows:

1. Select streams with the fewest (or no) Prime grade of service tuners.
2. Then select the streams at the lowest grade of service
3. Select the streams with the smallest number of Active tuners in the tuner table.
4. If the numbers of Active tuners are identical in two program streams, the stream is selected based on LUA value; the most recent LUAs are compared in the two streams and triage is performed on the stream with the older LUA.
5. The BSAEventIndication message is sent to all tuners (Active, Aged, Slated, Non-responding) in the tuner table, directing the client to display the "Program not Available" barker message.
6. Client responses to triage will vary. In some cases there will be no client response, such as when there is no active viewing actually taking place.
7. If the same program is re-selected by the client, the server may deny the BSAProgramSelectRequest and again direct the client to display the "Program not Available" barker message.
8. If the client requests an alternate program for that tuner that is already streaming, the server may direct the client to view that program, via the mini carousel and the BSAProgramSelectConfirm message.
9. If the client requests an alternate program for that tuner that is not currently streaming, that program's grade of service is taken into account as the Reclaim, GSRM overflow, or Triage process is invoked for that request.
10. If triage cannot be performed due to service grade or tuner status constraints, all BW options will have been exhausted. The BSAEventIndication message may be sent directing the client to display the "Program not Available" or similar barker message.

Figure 2A:
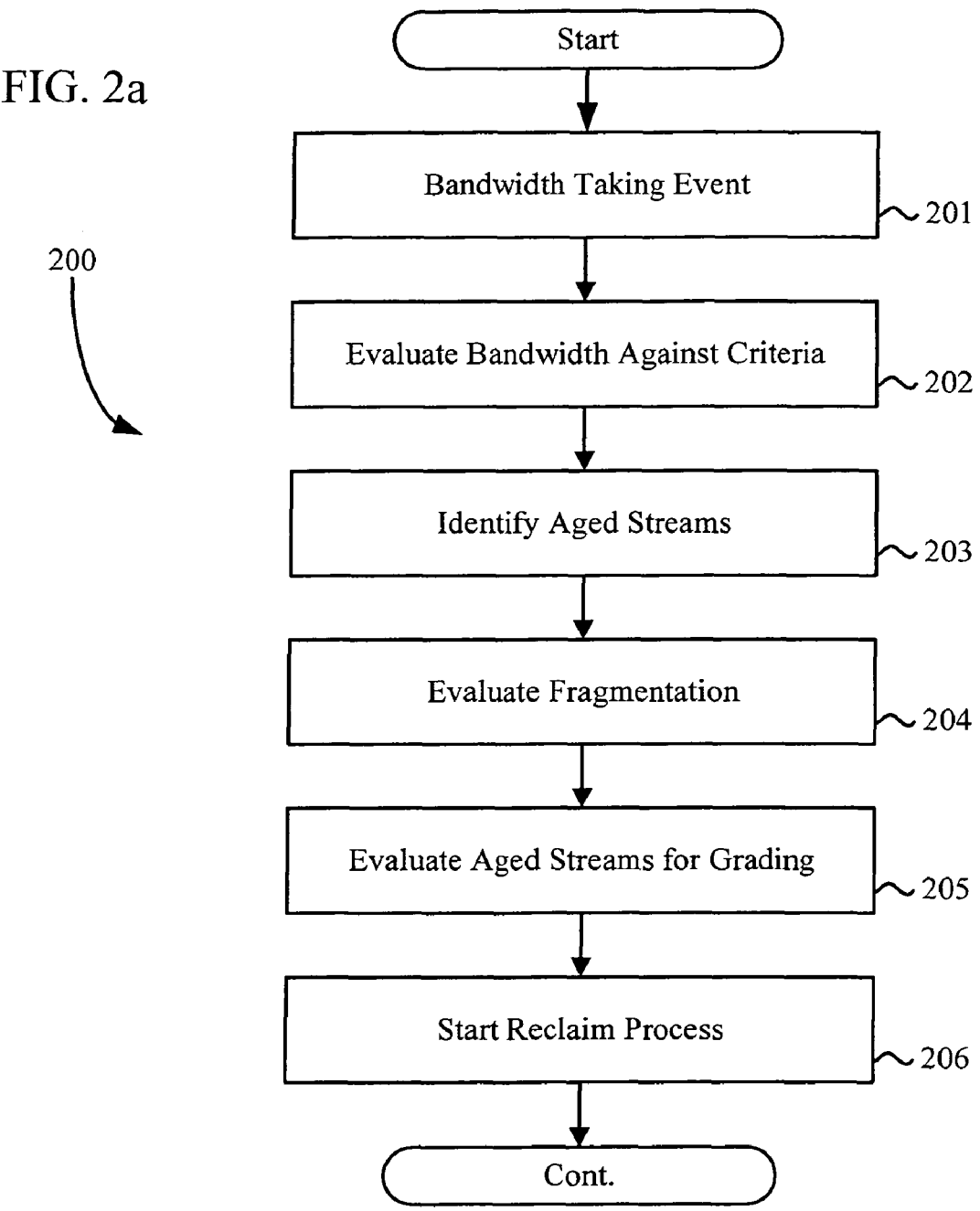
FIG. 2a is a logical flow chart illustrating a first embodiment of the general bandwidth reclamation process according to the invention.

Referring now to FIG. 2a, one embodiment of a generalized reclaim process according to the invention is described in detail. As shown in FIG. 2a, the exemplary process 200 comprises first undergoing a bandwidth taking or consumption event per step 201. The bandwidth is then evaluated against one or more criteria (such as e.g., a threshold) per step 202. Aged streams are then identified per step 203, and the existence of fragmentation (or need for defragmentation) is evaluated per step 204.

Per step 205, the aged streams are evaluated for grading, and the reclamation process started per step 206.

Figure 2B:
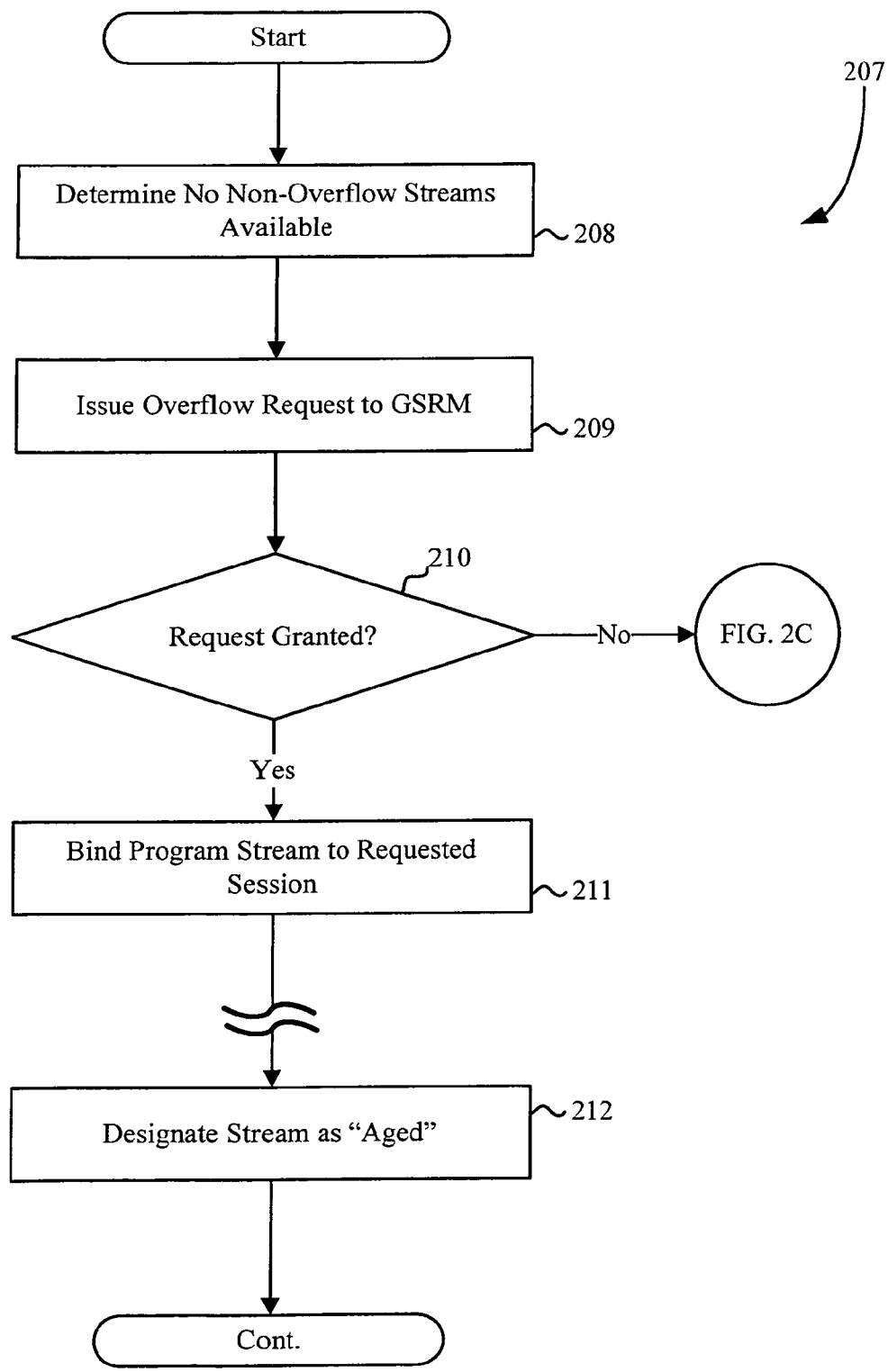
FIG. 2b is a logical flow chart illustrating a first embodiment of the general bandwidth overflow request process according to the invention.

Referring now to FIG. 2b, one embodiment of a generalized overflow process according to the invention is described in detail. As shown in FIG. 2b, the exemplary process 207 comprises first determining that no non-overflow streams are available per step 208. An overflow request is then issued per step 209. If the cognizant entity (e.g., GSRM) grants the request per step 210, then the program stream is bound to the requested session per step 211, and after a designated period of time, the stream is marked as "aged" (step 212).

If the request is not granted, the triage process (FIG. 2c) is utilized.

Figure 2C:
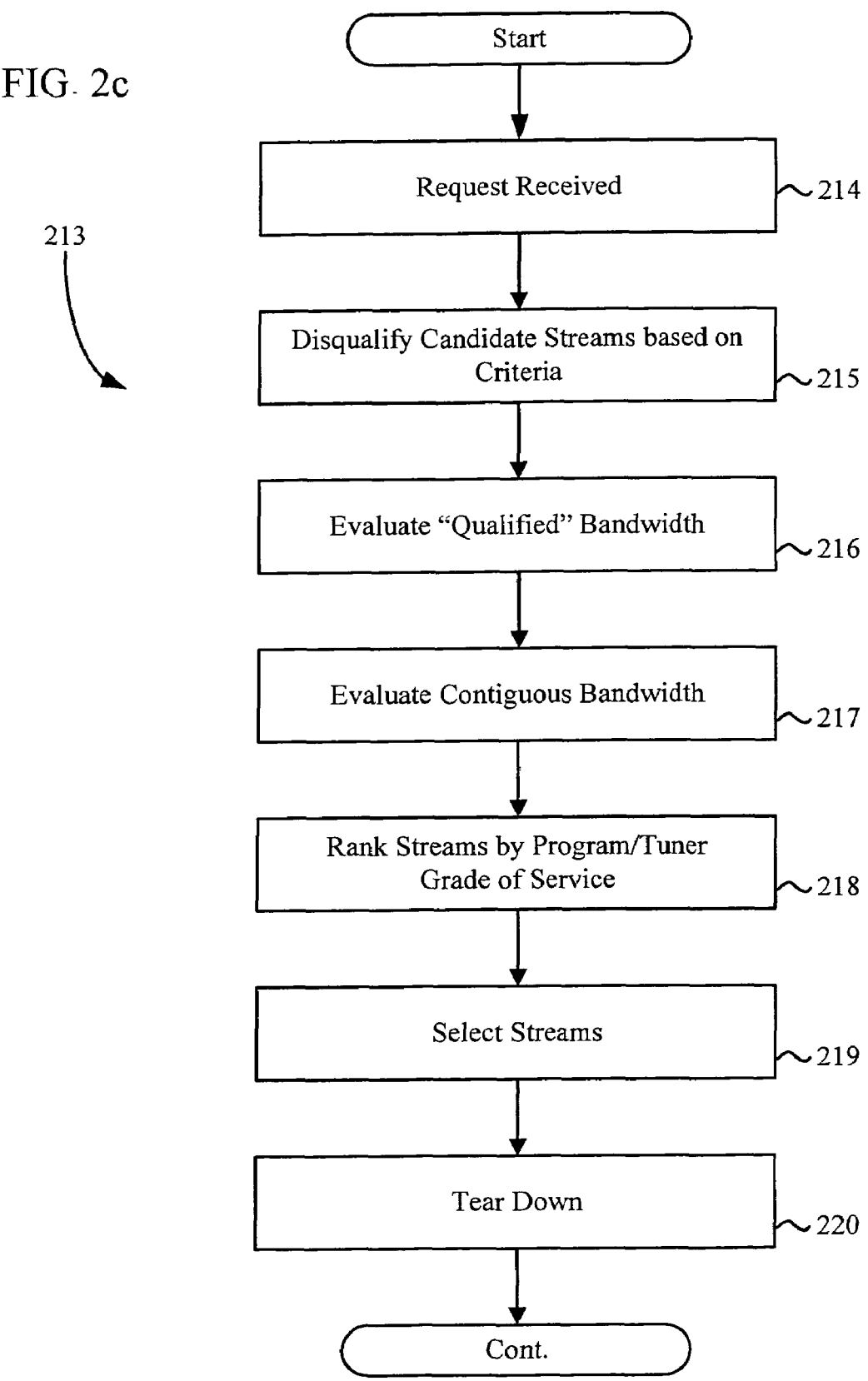
FIG. 2c is a logical flow chart illustrating a first embodiment of the general triage process according to the invention.

Referring now to FIG. 2c, one embodiment of a generalized triage process according to the invention is described in detail. As shown in FIG. 2c, the exemplary process 213 comprises first receiving the overflow request (see discussion of FIG. 2b above) per step 214. Next, one or more candidate streams are evaluated and disqualified using one or more criteria (discussed in greater detail below). "Qualified" bandwidth is then identified and evaluated, as is contiguous bandwidth (steps 216 and 217). Streams are then ranked by program and tuner grade of service (step 218), and the streams selected (step 219) and torn down/repurposed per step 220.

Figure 2D:
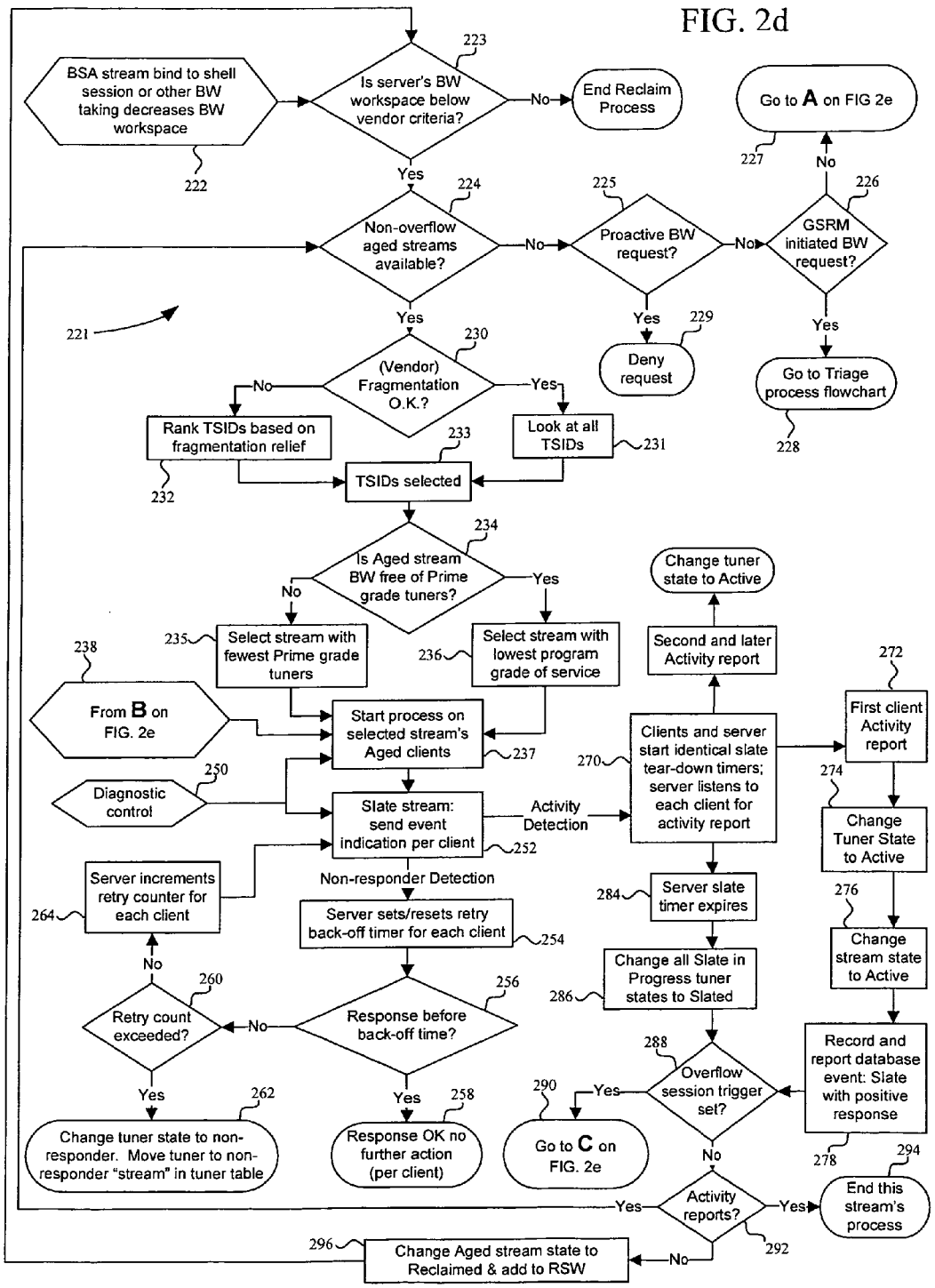
Figure 2E:
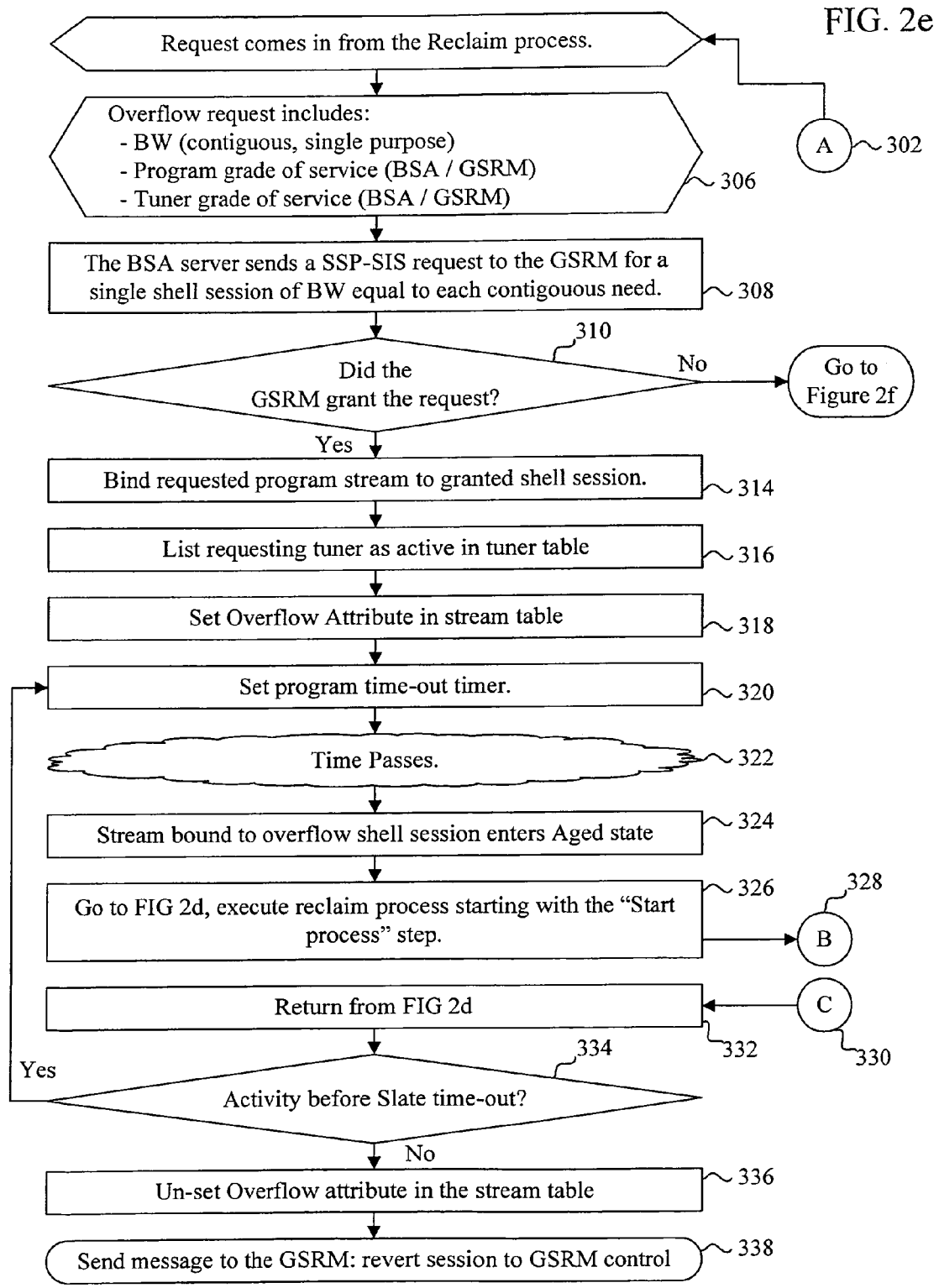
FIG. 2e is a logical flow chart illustrating a first exemplary implementation of the general method of FIG. 2b.
Figure 2F:
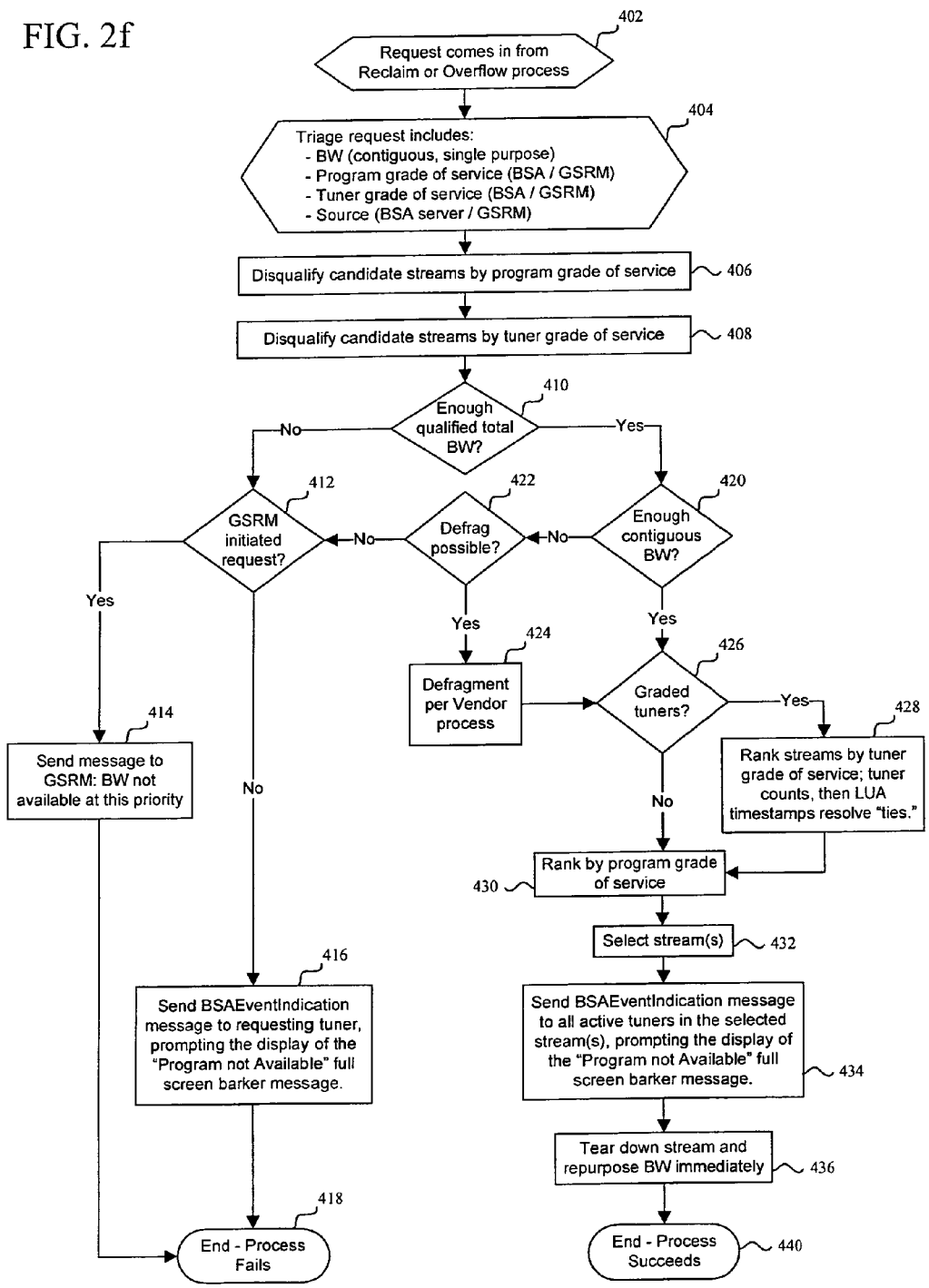
FIG. 2f is a logical flow chart illustrating a first exemplary implementation of the general method of FIG. 2c.

FIGS. 2d-2f illustrate exemplary implementations of the logical flow and methodology of the processes of FIGS. 2a-2c, respectively, and each is now described in greater detail.

Referring now to FIG. 2d, the exemplary reclamation process can be initiated in one of three ways: (i) when the BSA stream binds to shell session or other bandwidth taking decreases the bandwidth workspace per step 222; (ii) when requested by the overflow process (FIG. 2e); or (iii) via a request from a diagnostic control 250.

When the BSA stream binds to the shell session (or other bandwidth taking) decreases the bandwidth workspace (step 222), the reclaim process begins. An initial determination of whether the server's bandwidth workspace falls below the vendor criteria (step 223) is made. If the server's bandwidth is not below the vendor criteria, the reclaim process ends. When the server's bandwidth workspace is below the vendor criteria, a determination of whether non-overflow aged streams are available is made per step 224.

If there are no non-overflow aged streams available, the next step is based on whether a proactive bandwidth request was made (step 225). Proactive bandwidth requests will be denied per step 229. Processing of non-Proactive Bandwidth requests depend on whether the bandwidth request was initiated by the GSRM or not per step 226. If the GSRM did not initiate the bandwidth request, the BSA Overflow Shell Session Request Process begins per step 227 (see FIG. 2e). If the GSRM did initiate the bandwidth request, the triage process begins per step 228 (see FIG. 2f).

When there are non-overflow aged streams available, the acceptability of (vendor) fragmentation is determined per step 230. If (vendor) fragmentation is acceptable, all TSIDs are analyzed per step 231. If (vendor) fragmentation is not acceptable, TSIDs are ranked based on fragmentation relief per step 232. The TSIDs are then selected per step 233.

The process continues by determining whether the aged stream bandwidth is free of Prime Grade tuners per step 234. If the aged stream bandwidth is not free of Prime Grade tuners, the system selects the stream(s) with the fewest Prime Grade tuners per step 235. If the aged stream bandwidth is free Prime Grade tuners, the system selects the stream(s) with the lowest program grade of service per step 236.

Four different sources of aged client streams exist in the illustrated implementation: (i) aged stream bandwidth not free of prime grade tuners 235; (ii) aged stream bandwidth free of prime grade tuners 236; (iii) aged stream bandwidth coming from the overflow process 238 (See FIG. 2e); and (iv) aged stream bandwidth coming from a diagnostic control 250. Regardless of the source, the process is started on the selected stream's aged clients per step 237.

The stream is then "slated" and an event indication is sent to each client per step 252 (this step may also be initiated in the course of a diagnostic control of step 250). User/CPE activity determines the subsequent course of events.

If there is a non-responder detection, the server sets/(resets) the retry back-off timer for each client per step 254. The system waits for a response per step 256. If there is a response by a client before the back-off time counts down, then no further action is taken on the responding client per step 258. However, if the back-off time reaches counts down without a response, the retry count is evaluated (step 260). If the retry count is exceeded, the tuner state changes to "non-responder", and the tuner is moved to the non-responder "stream" in the tuner table (step 262). When the retry count is not exceeded, the server increments the retry counter for each appropriate client per step 264. The stream is then slated as before per step 252 (see above), and the process repeats.

If instead of there being a non-responder detection, there is an activity detection, affected clients and the server start identical slate tear-down timers, and the server listens to each client for an activity report per step 270. The first of n client activity reports is received per step 272. That first client's tuner state is changed to active per step 274. The first stream state is changed to active per 276. Then the system records and reports a database event (e.g., slate with positive response) per step 278.

If the overflow session trigger (step 288) is not set, and the first stream's activity report is received (step 292), the process ends for the first stream; the activity report will be used for the analysis of whether non-overflow aged streams are available per step 234. The process is then repeated for the second and subsequent streams of activity reports until the server slate timer expires. Once the server slate timer expires per step 284, all "Slate in Progress" tuner states are changed to "Slated" per step 286.

If the overflow session trigger is set (step 288), the overflow process (FIG. 2e) controls (step 332).

If the overflow session trigger is not set, and there are no activity reports (step 292), then the aged stream state is changed to "reclaimed", and added to RSW. The server's bandwidth workspace is analyzed again to determine whether it is below vendor criteria per step 223. The process repeats from this point as needed.

FIG. 2e. illustrates an exemplary implementation of the Overflow Shell Session Request Process ("overflow process"). This process begins when a request is received from the reclaim process (FIG. 2d) per step 304.

The exemplary configuration of the overflow request includes: (i) the bandwidth (contiguous or single purpose), (ii) the program grade of service (BSA or GSRM), and (iii) the tuner grade of service (BSA or GSRM), which are extracted per step 306. The BSA server then sends an SSP-SIS request to the GSRM for a single shell session of bandwidth equal to each contiguous need per step 308.

Whether the GSRM granted the request determines the next appropriate action per step 310. When the GSRM denies the request, the triage process is initiated per step 312 (see FIG. 2f). When the GSRM approves the request, the system binds the requested program stream to the granted shell session per step 314. The requesting tuner is listed as active in the tuner table per step 316. The overflow attribute in the stream table is set per 318, and the program time-out timer is set per step 320.

After the passage of some time (step 322), the stream bound to the overflow shell session enters the aged state per step 324. The process now moves to the reclaim process flow (see FIG. 2d) to execute the reclaim process per step 326.

There are a variety of possible results from the reclaim process 221. One result is to resume the overflow process (FIG. 2e) per step 332. If there is activity before the slate time-out (step 334), the program time-out timer is set per step 320, and the process repeats from that point (see above). If there is no activity before slate time-out, the overflow attribute in the stream table is deselected per step 336. Finally, a message is sent to the GSRM to revert the session to GSRM control per step 338.

As shown in FIG. 2f, the exemplary triage process 400 begins at step 402 when a request is received from the reclaim process (FIG. 2d) or the overflow process (FIG. 2e). The exemplary triage request of step 404 includes: (i) the type of bandwidth being requested (contiguous or single purpose), (ii) the program grade of service, (iii) the tuner grade of service, and (iv) the source of the request (BSA server or GSRM).

The determination of candidate streams is made using a process of elimination. Candidate streams are disqualified first based upon the program grade of service (step 406) and secondly by the tuner grade of service (step 408). After these initial disqualifications, the next step is to evaluate whether there is enough remaining qualified total bandwidth per step 410.

If there is not enough qualified total bandwidth, the process is dependent on whether the GSRM initiated the request or not (step 412). If the GSRM initiated the request, a message is sent to the GSRM that bandwidth is not available at this priority per step 414, and subsequently the process fails per step 418. If the GSRM did not initiate the request, the BSAeventIndication message is sent to the requesting tuner prompting the display of the "Program not Available" full screen barker message per steps 416 and 418.

If there is enough qualified total bandwidth at step 410, it must be determined whether the bandwidth is contiguous or not. When there is insufficient contiguous bandwidth, the determination of whether it is possible to defragment the bandwidth is made per step 422.

When the defragmentation is impossible, a determination of whether GSRM initiated the request is made per step 412; the process follows the same flow as disclosed above from step 412 onward. If defragmentation is possible, the bandwidth is defragmented per the vendor process of step 424.

After enough contiguous bandwidth is available (initially, or after defragmentation per step 424), the existence of graded tuners is taken into account in step 426. Graded tuners will rank streams by tuner grade of service and tuner counts. Last User Action (LUA) timestamps will resolve any existing "ties" per step 428. Graded tuners and/or ungraded tuners are then ranked by program grade of service per step 430. Stream(s) are next selected per step 432, and then a BSAEventIndication message is sent to all active tuners in the selected stream(s), prompting the display of the "Program not Available" full screen barker message per step 434. The stream is subsequently torn down, and the bandwidth is immediately repurposed in step 436. The process then ends in success at step 440.

Figure 3A:
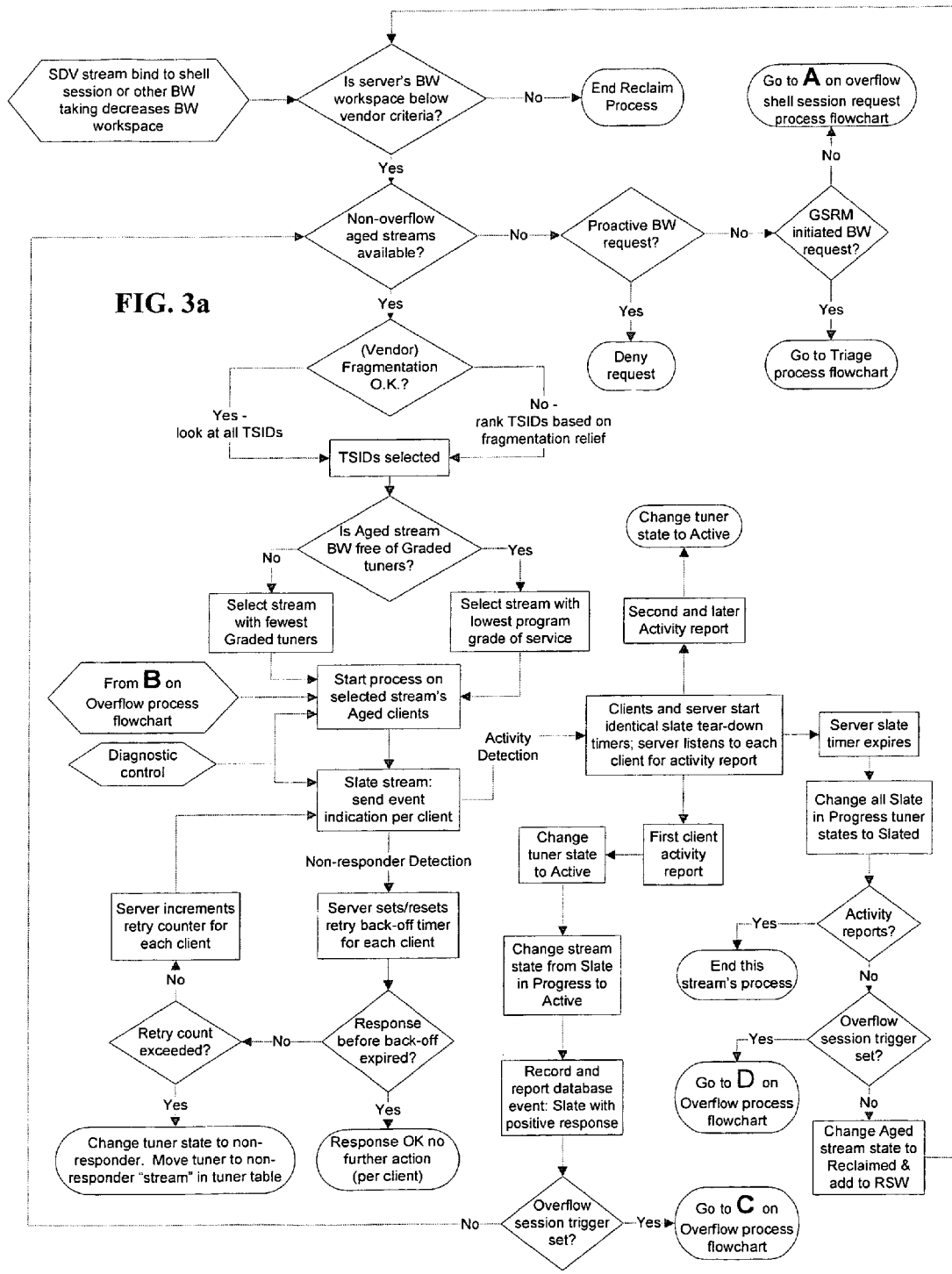
FIG. 3a is a logical flow chart illustrating a second embodiment of the bandwidth reclamation process according to the invention.
Figure 3B:
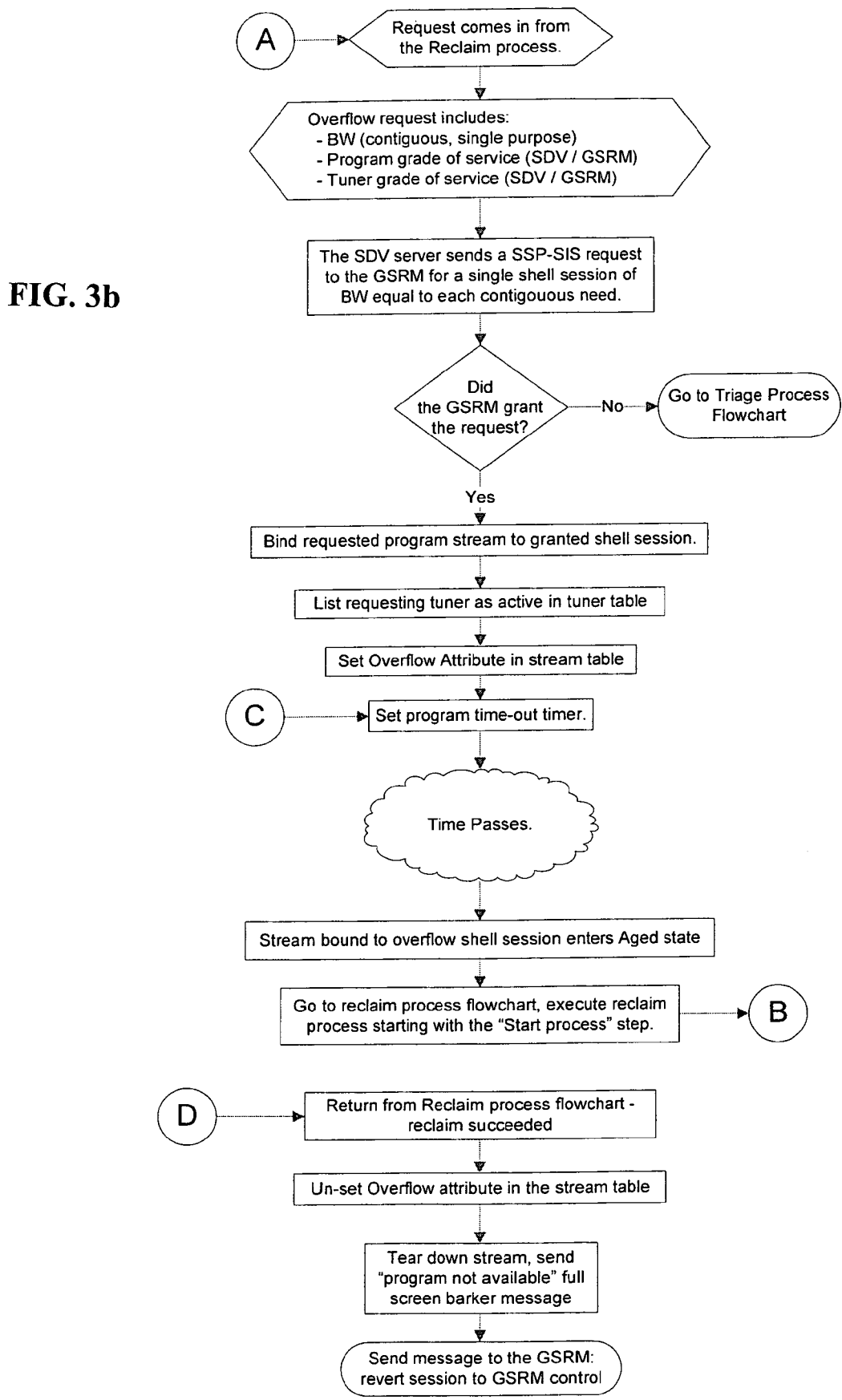
FIG. 3b is a logical flow chart illustrating a second embodiment of the bandwidth overflow request process according to the invention.

FIGS. 3a and 3b (along with the triage flow of FIG. 2c) illustrate an alternate embodiment of the invention.

BSA Server Stream State and Reclamation Flow Diagram

Figure 4:
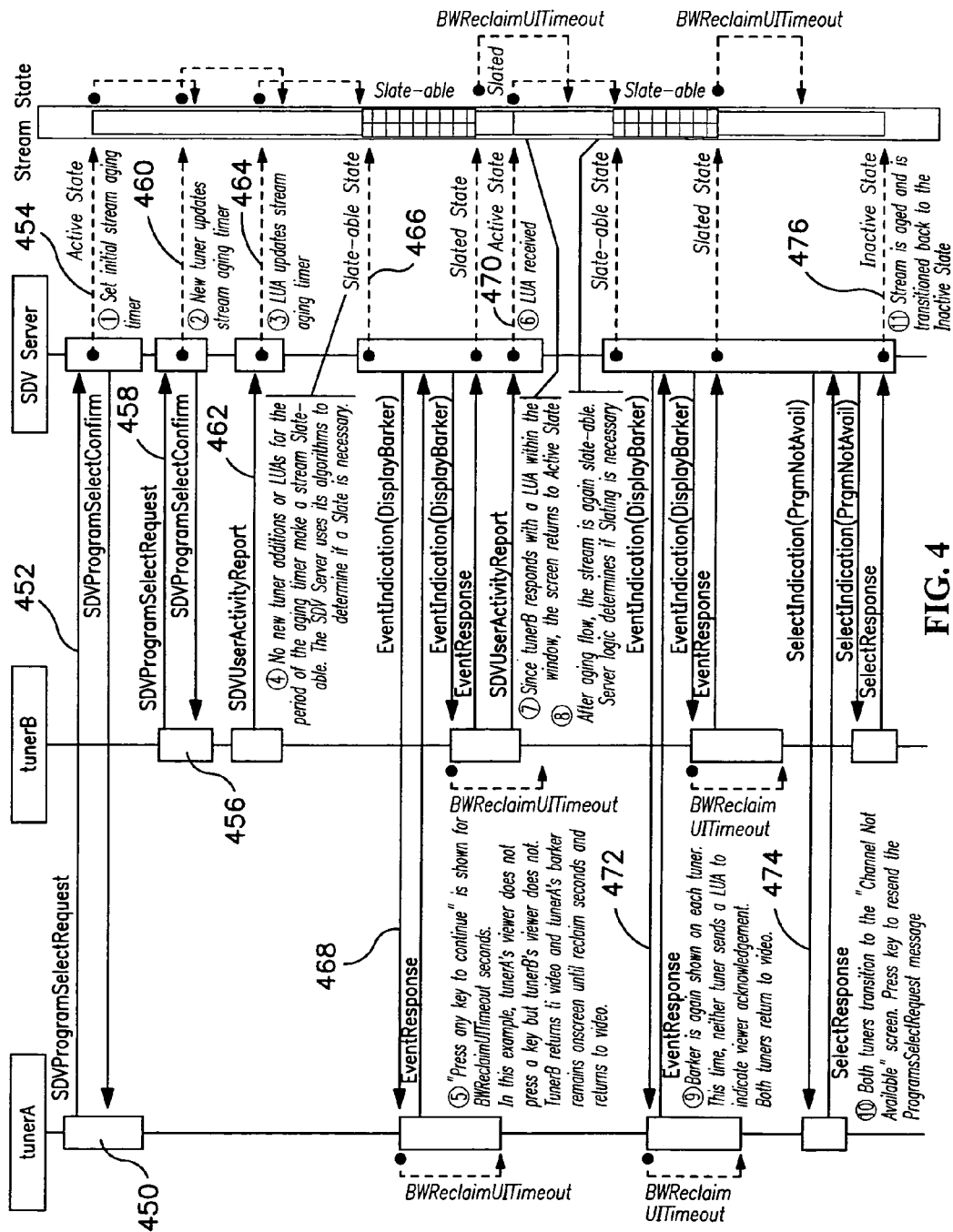
FIG. 4 is a graphical illustration of an exemplary BSA Server handling process flow for multiple tuners on a stream.

FIG. 4 illustrates BSA Server handling process flow for multiple tuners on a stream. While not exhaustive, the exemplary flow of FIG. 4 illustrates many of the common interactions during the stream lifecycle. For example, when Tuner A 450 first initiates a request (e.g., SDVProgramSelectRequest) 452, the server enters the Active State 454. A second tuner (Tuner B) 456 issues a second request 458, which updates the stream aging timer 460. A user activity report (LUA) from the second tuner 462 causes an update to the stream aging timer 464.

Next, the stream becomes "slatable" 466 when no new LUAs are received during the period of the aging timer.

When slated, the Tuner A display shows a barker to "Press any key to continue" or the like 468. Tuner B sends a response (LUA), which returns the process to the active state 470. When the process again becomes "slateable", the barker is again displayed 472, but this time no LUA is sent by either Tuner A or Tuner B. Both tuners then transition to a "Program not available" barker 474, and the stream is aged and transitions back to the inactive state 476.

Some operational instances not explicitly shown in FIG. 4 include:

1. If a tuner does not ACK the BSAEventIndication Slate message with an BSAEventResponse then the BSA Server may repeatedly resend the BSAEventIndication Slate message until the BSA Client acknowledges or it can be concluded that it is a non-responder. The number of re-tries to classify the client as a non-responder is defined in the exemplary MCMIS configuration, although other values may be used.
2. If a tuner does not ACK the BSASelectIndication (PrgmNotAvail) with a BSASelectResponse, then the BSA Server should resend the BSASelectIndication (PrgmNotAvail) until the BSA Client acknowledges or it can be concluded that it is a non-responder. The number of re-tries to classify the client as a non-responder is defined in the MCMIS configuration, although other values may be used.
3. If a LUA message is received during the stream reclamation process, then the BSA Server resets the stream to Active State. Even if the BSA Client was not currently known to the BSA Server, the LUA is noted, as it may be from a previously unresponsive BSA Client.
4. If a new BSAProgramSelectRequest message is received during reclamation then the BSA Server should reset the stream to Active State.

If a BSA Client is determined to be a non-responder, then it should be removed from the algorithm used to maintain stream state. The BSA Server should use the same configuration it published in the MC to determine the number of times to retry sending a message and how long to wait between retry attempts.

To prevent rouge BSA Clients from negatively affecting the system, the BSA Server provides a mechanism to "black list" a MAC address. At a minimum, the operator should be able to input a MAC address or import a CSV file. Value-added algorithms to determine rouge BSA Client status are in the exemplary embodiment at the discretion of the BSA Server vendor, although other configurations may be utilized consistent with the invention.

Figure 5:
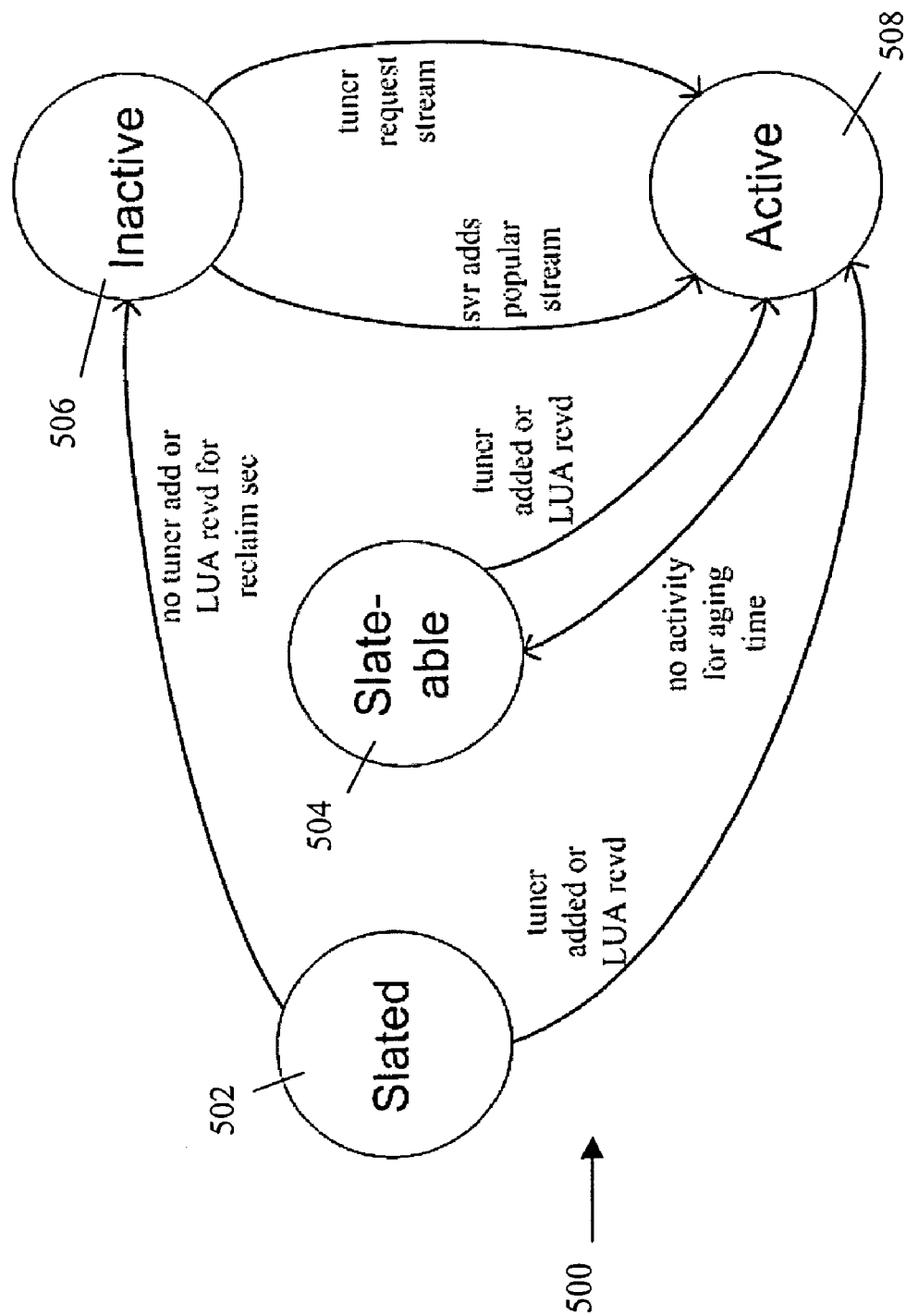
FIG. 5 is a state diagram illustrating the exemplary logical states and flow associated with the one embodiment of the invention.

FIG. 5 is a state diagram illustrating the exemplary logical states and flow 500 associated with the exemplary embodiment of the invention. As shown in FIGS. 4 and 5, the various states comprise: (i) an active state 508; (ii) an inactive state 506; (iii) a slated state 502; and (iv) a slateable state 504. The transition from the inactive state 506 to the active state 508 can be related to a tuner requesting a given stream, or a server adding a stream as shown. From the active state, the process may transition to the slateable state 504 by way of no activity being detected for a given period of time; e.g., "aging" time (or similar criteria being met). Transition from the slateable state to the active state occurs upon a tuner being added, or an LUA (timestamp) being received. Transition from the slated state 502 to the inactive state may occur when no tuner add occurs or LUA is received for the reclaim period.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. In a switched content delivery network, a method of operating said network comprising:
   receiving a request for content from at least one of a plurality of devices associated with said network;
   determining a bandwidth deficiency, said bandwidth deficiency affecting an ability of said network to service said request; and
   performing a bandwidth recovery process, said bandwidth recovery process being selected and performed such that an amount of bandwidth reclaimed is substantially proportional to a value of said bandwidth deficiency, said selection and performance of said bandwidth recovery process comprising:
      if a bandwidth reclamation process may be performed, performing said reclamation process;
      if said bandwidth reclamation process cannot be performed, performing an overflow process; and
      if said overflow process cannot be preformed, performing a process for terminating one or more content streams without regard to a current use thereof.

2. The method of claim 1, wherein said determining is performed substantially in response to said request.

3. The method of claim 1, wherein said determination of a bandwidth deficiency comprises determining whether an amount of available bandwidth is below a predetermined threshold.

4. The method of claim 1, wherein said selection comprises selection of said bandwidth reclamation process, said bandwidth reclamation process comprising:
   characterizing individual ones of program streams currently provided to said plurality of devices in said network; and
   stopping delivery of certain ones of said individual ones of said program streams for which no active viewers are found.

5. The method of claim 1, wherein selection comprises selection of said bandwidth reclamation process, said bandwidth reclamation process comprising consolidating bandwidth by relocating individual ones of program streams spread across available bandwidth.

6. The method of claim 1, wherein said selection comprises selection of said overflow process, said overflow process comprising obtaining temporary use of a portion of bandwidth equal to said bandwidth deficiency.

7. The method of claim 1, wherein said selection comprises selection of said process for tearing down one or more content streams without regard to a current use thereof, said process comprising tearing down one or more program streams according to a hierarchy.

8. A network server comprising:
   an interface configured to receive a request for content from at least one of a plurality of devices in said network;
   a processor;
   a storage device operatively coupled to said processor; and
   at least one computer program disposed on said storage device, said at least one computer program comprising a plurality of instructions configured to, when executed:
      determine a bandwidth deficiency affecting an ability of said apparatus to provide said requested content to said at least one of said plurality of devices; and
      based at least in part on said determination, selecting at least one of a plurality of bandwidth recovery processes, each of said processes comprising a different level of impact on said ability of said apparatus to provide said requested content to said at least one of said plurality of devices;
   wherein said selecting of said at least one of said plurality of said bandwidth recovery processes comprises selection thereof in an escalating level of impact on said provided services based at least in part on a severity of said bandwidth deficiency determined by said act determination of a bandwidth deficiency.

9. The network server of claim 8, wherein said network comprises a broadcast switched content delivery network having a plurality of switches disposed at respective ones of switching hubs, said network server being adapted to control at least a portion of the operation of at least one of said switches.

10. The network server of claim 8, wherein said interface is further in data communication with a global session resource manager (GSRM) of said network.

11. The network server of claim 8, wherein:
   said plurality of bandwidth recovery processes include at least: (i) a bandwidth reclamation process; (ii) a bandwidth overflow request process; and (iii) a process for tearing down one or more content streams without regard to a current use thereof; and
   said plurality of bandwidth recovery processes are applied hierarchically according to said different levels of impact on said ability of said apparatus to provide said requested content to said at least one of said plurality of devices.

12. A method of managing bandwidth in a switched digital content distribution network, comprising:
   receiving a request for content from a first one of a plurality of user devices in said network;
   identifying a bandwidth deficiency;
   identifying at least one stream for which a last user activity taken with respect thereto was more than a predetermined time prior to said evaluation;
   determining a service level for said at least one stream;
   based at least in part on said service level and said last user activity, requesting a temporary reclamation of at least a portion of bandwidth allocated to said at least one stream;
   if said temporary reclamation of at least said portion of said bandwidth allocated to said at least one stream is granted, providing said requested content to said first user device; and
   immediately reclaiming said additional available bandwidth from said first user device after a predetermined time from a last user activity taken with respect to said content at said first user device.

13. The method of claim 12, further comprising identifying and consolidating fragmented bandwidth.

14. The method of claim 12, further comprising querying a user associated with said at least one stream in order to determine actual viewing thereof, said act of reclaiming said bandwidth being further based at least in part on a response to said query.

15. A method of managing bandwidth in a switched digital network, comprising:
- receiving a request for content from a first one of a plurality of user devices in said network;
- determining that an available bandwidth is not sufficient to service said request;
- requesting temporary access to additional available bandwidth;
- if said temporary access to said additional available bandwidth is granted, providing said requested content to said first user device; and
- immediately reclaiming said additional available bandwidth from said first user device after a predetermined time from a last user activity taken with respect to said content at said first user device.

16. The method of claim 15, wherein said grant of said temporary access to said additional bandwidth comprises access to a portion thereof equal to an amount necessary to service said request for said content.

17. The method of claim 15, wherein if said temporary access to said additional available bandwidth is not granted, utilizing at least one scheme for determining a hierarchy for tearing down use of one or more program streams in order to service said request.

18. A method of managing bandwidth in a switched digital network, comprising:
- determining a condition of insufficient bandwidth to accommodate current demands on a network;
- implementing at least one process configured to provide sufficient bandwidth with minimal affect on a level of service currently provided to users in said network by taking into account current use of one or more streams distributed on said bandwidth; and
- if said at least one process cannot provide sufficient bandwidth with said minimal affect on said level of service, determining at least one of said one or more streams distributed on said bandwidth to teardown without regard to said current use thereof.

19. The method of claim 18, wherein said at least one process configured to provide sufficient bandwidth with minimal affect on a level of service currently provided to said users comprises at least one of:
- a process for reclamation of bandwidth;
- a process for consolidation of fragmented bandwidth; and/or
- a process for requesting temporary access to additional bandwidth.

20. The method of claim 18, wherein said act of taking into account current use of one or more streams distributed on said bandwidth comprises providing a message requiring response from viewers of said one or more streams.

* * * * *